US012639733B2

(12) United States Patent
Yang et al.

(10) Patent No.: US 12,639,733 B2
(45) Date of Patent: May 26, 2026

(54) SORTATION SYSTEM FOR CUSTOMER RETURN ITEMS

(71) Applicant: Target Brands, Inc., Minneapolis, MN (US)

(72) Inventors: Te Yang, Minneapolis, MN (US); Gregory Lisso, Minneapolis, MN (US); Karla Kilian, Minneapolis, MN (US); Ashfak Jafri, Minneapolis, MN (US); Tyler Park, Minneapolis, MN (US); Sean Griffin, Minneapolis, MN (US); David Ogunewe, Minneapolis, MN (US); Patrick McRaith, Minneapolis, MN (US); Nicole Loehr, Minneapolis, MN (US); Divya Ds, Minneapolis, MN (US); Xinbo Wang, Minneapolis, MN (US); Majid Jahani, Minneapolis, MN (US); Kayla Bosak, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 405 days.

(21) Appl. No.: 18/199,221

(22) Filed: May 18, 2023

(65) Prior Publication Data

US 2024/0386470 A1      Nov. 21, 2024

(51) Int. Cl.
| | |
|---|---|
| *G06Q 30/06* | (2023.01) |
| *G06Q 10/0837* | (2023.01) |
| *G06Q 30/02* | (2023.01) |
| *G06Q 30/0202* | (2023.01) |

(52) U.S. Cl.
CPC ......... *G06Q 30/06* (2013.01); *G06Q 10/0837* (2013.01); *G06Q 30/0202* (2013.01); *G06Q 30/0278* (2013.01)

(58) Field of Classification Search
CPC .............. G06Q 30/06; G06Q 10/0837; G06Q 30/0202; G06Q 30/0278
See application file for complete search history.

(56) References Cited

U.S. PATENT DOCUMENTS

| | | | | |
|---|---|---|---|---|
| 6,754,637 B1 * | 6/2004 | Stenz | ..................... | G06Q 30/06 |
| | | | | 705/28 |
| 7,596,516 B2 * | 9/2009 | Starkowsky | ......... | G06Q 10/087 |
| | | | | 705/302 |

(Continued)

FOREIGN PATENT DOCUMENTS

WO      WO 2001/067344      9/2001

*Primary Examiner* — Michael Jared Walker
(74) *Attorney, Agent, or Firm* — Fish & Richardson P.C.

(57)      ABSTRACT

A customer return management system operates to categorize reverse items for resale, such as returned items or overstock inventory, and deliver the categorized items through a variety of different reverse supply chains in a way to increase a net recovery rate. The system uses a sortation system that performs a two-step process for sorting the reverse items into different reverse supply channels. In a first step, the items can be scanned and divided into two categories based on their value, such as high value items and low value items. The low value items can be quickly liquidated as a bulk. In a second step, high value items can be categorized into a number of different sorts, which are taken to different resale channels.

18 Claims, 11 Drawing Sheets

(56) References Cited

U.S. PATENT DOCUMENTS

| | | | | |
|---|---|---|---|---|
| 7,917,405 B2 * | 3/2011 | Bonner | ................. | H04W 4/029 |
| | | | | 370/406 |
| 8,156,007 B1 * | 4/2012 | Anthony | ................ | G06Q 99/00 |
| | | | | 705/26.1 |
| 8,396,755 B2 * | 3/2013 | Bonner | ................... | H04W 4/20 |
| | | | | 705/26.1 |
| 9,563,870 B1 * | 2/2017 | Szmajda | .............. | G06Q 10/087 |
| 10,592,856 B2 | 3/2020 | Szmajda et al. | | |
| 11,126,960 B2 * | 9/2021 | Mahajan | ................ | G06Q 40/06 |
| 2002/0010634 A1 * | 1/2002 | Roman | .............. | G06Q 10/0837 |
| | | | | 705/14.1 |
| 2004/0193438 A1 * | 9/2004 | Stashluk, Jr. | .......... | G06Q 30/02 |
| | | | | 705/304 |
| 2005/0216368 A1 * | 9/2005 | Wechsel | ................. | G06Q 30/00 |
| | | | | 705/28 |
| 2006/0149577 A1 * | 7/2006 | Stashluk, Jr. | ........ | G06Q 30/016 |
| | | | | 705/13 |
| 2017/0124635 A1 * | 5/2017 | Shao | .................. | G06Q 30/0283 |
| 2020/0051018 A1 * | 2/2020 | Shamiss | .............. | G06Q 10/087 |
| 2020/0126027 A1 * | 4/2020 | Mahajan | .............. | G06Q 10/087 |
| 2021/0150616 A1 * | 5/2021 | Kentris | ............. | G06Q 10/0837 |
| 2022/0076326 A1 * | 3/2022 | Mahajan | .......... | G06Q 10/06315 |
| 2023/0005001 A1 * | 1/2023 | Watts | ................. | G06Q 30/0278 |

* cited by examiner

200

202
Identify Reverse Items

204
Sort Reverse Items into Low Value Items and High Value Items

206
Convey Low Value Items into Bulk Liquidation Channel(s)

208
Convey High Value Items to Central Return Center

210
Sort High Value Items into Multiple Sub-Sorts

212
Convey Multiple Sub-Sorts of Items into Multiple Channels

400

402
Receive High Value Items at Central Return Center

404
Retrieve Information on High Value Items

406
Determine Optimized Value of Items

408
Sort Items into Multiple Sub-Category Sorts of Items

410
Determine Resale Channels Suitable for Respective Sub-Category Sorts

412
Convey Multiple Sub-Category Sorts of Items into Respective Resale Channels

96 Sub-Category Sorts  500

| SUB-CATEGORY SORTS | SUB-CATEGORY SORTS | SUB-CATEGORY SORTS | SUB-CATEGORY SORTS |
|---|---|---|---|
| BEAUTY/COSMETICS | HOME | WOMENS/ACCESS | MENS/KIDS |
| COSMETICS | BASIC BEDDING | A NEW DAY | BOYS |
| HAIR CARE | BATH | JEWELRY & ACCESSORIES | BOYS SWIM/OUTERWEAR |
| PERSONAL CARE | CANDLES | KIDS FOOTWEAR | GIRLS SWIM/OUTERWEAR |
| SKIN/BATH/FRAGRANCES | COLLECTION BEDDING | INTIMATES | GIRLS |
| ESSENTIALS | DECORATIVE ACCESSORIES | DENIM | INFANT/TODDLER |
| BABY CARE | FLOORCARE | GRAPHICS SPECIAL PROJECTS | CHILDREN ACCESSORIES |
| HOUSEHOLD CLEANING | FURNITURE | HANDBAGS | KIDS LICENSE |
| INFANT BASICS/FURNITURE | HARDWARE | KIDS PERFORMANCE | KIDS SLPWR/FASHION UNDRWR/BODYWEAR |
| OTC-PERSONAL CARE | HEARTH AND HAND | KNOX ROSE | KIDS SOCKS/PACKAGED UNDERWEAR |
| PAPER/DSPBL PLASTICS | KIDS HOME | LEGWEAR | LICENSE |
| PET CARE | KITCHENWARE | MATERNITY | MENS ESSENTIALS |
| PHARMACY-OTC | LAWN/GARDEN | MENS/WOMENS FOOTWEAR | MENS LOUNGE/ACCESS |
| HARDLINES | LIGHTING/WALL DECOR | MENS PERFORMANCE | MENS PANTS/SHORTS |
| Portable Electronics | PATIO/GRILL | OUTERWEAR | MENS SEASONAL APPAREL |
| TV/HOME ELECTRONICS | RUGS | PROLOGUE | MENS TOPS/SWEATERS |
| 80 & 255 MOBILE/ACCESSORIES | SCHOOL/OFFICE SUPPLIES | SLEEPWEAR | NEWBORN |
| ACTIVITIES/DOLLS/PLUSH | SEASONAL | SWIMWEAR | NIT LICENSE |
| BICYCLES/PHYSICAL FITNESS | SMALL APPLIANCES | UNIVERSAL THREAD | NIT SLEEPWEAR |
| BOOKS/MAGAZINES | SOFT DECOR | WHO WHAT WEAR | |
| ENTERTAINMENT LICENSE | STORAGE/ORGANIZATION | WILD FABLE | |
| FAN CENTRAL | TABLETOP | WOMENS FASHION ACTIVE | |
| GAMES/DIECAST/ACTION FIGURES | TRIM A TREE | WOMENS LICENSE/GRAPHICS | |
| IMAGING/OFFICE | WINDOW | WOMENS PERFORMANCE | |
| LUGGAGE | | WOMENS PLUS | |
| NO-CONTRACT MOBILE/ACCESSORIES | | XHILARATION | |
| TEAM/SPORT EQUIPMENT | | | |
| OUTDOOR RECREATION | | | |
| VIDEO GAMES | | | |
| PORTABLE ELECTRONICS | | | |
| PRESCHOOL/SEASONAL TOYS | | | |
| SEASONAL | | | |

FIG. 5

Figure 9:
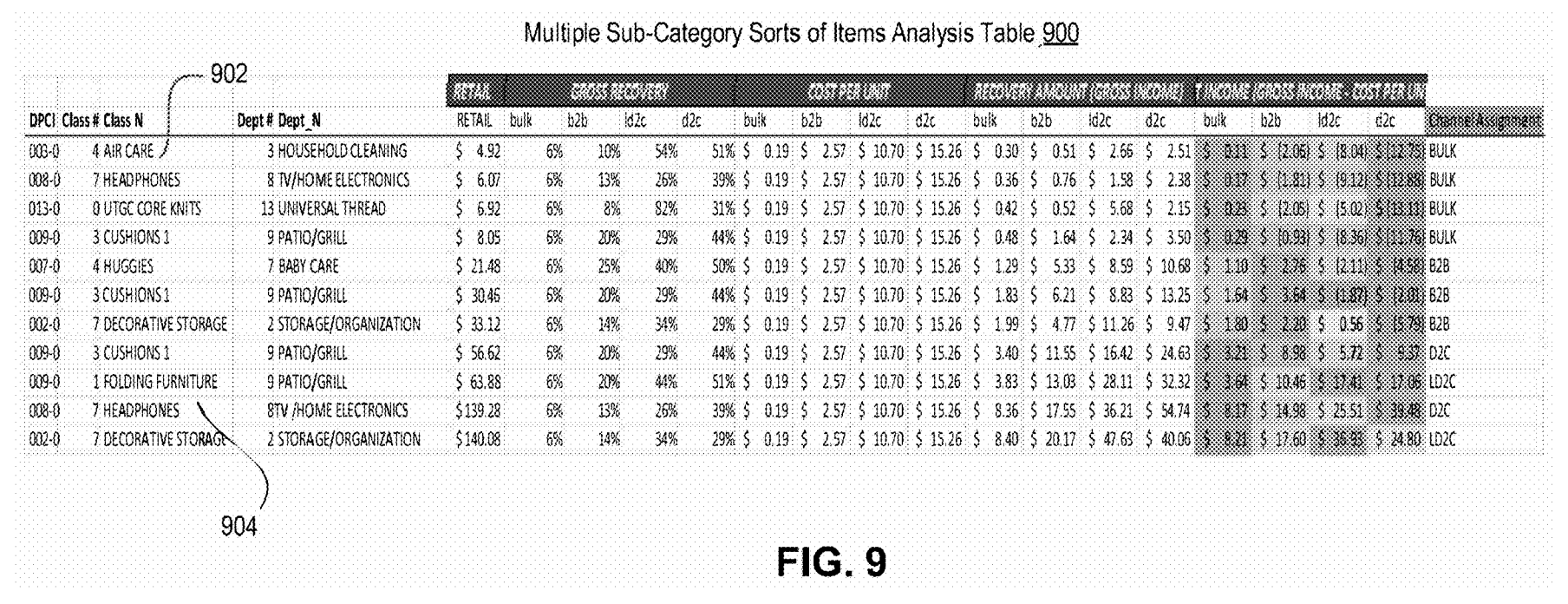

Multiple Sub-Category Sorts of Items Analysis Table 900

| DPCI | Class # Class N | Dept # Dept N | RETAIL | bulk | b2b | ld2c | d2c | bulk | b2b | ld2c | d2c | bulk | b2b | ld2c | d2c | bulk | b2b | ld2c | d2c | |
|---|---|---|---|---|---|---|---|---|---|---|---|---|---|---|---|---|---|---|---|---|
| 003-0 | 4 AIR CARE | 3 HOUSEHOLD CLEANING | $ 4.92 | 6% | 10% | 54% | 51% | $ 0.19 | $ 2.57 | $ 10.70 | $ 15.26 | $ 0.30 | $ 0.51 | $ 2.66 | $ 2.51 | | | | | BULK |
| 008-0 | 7 HEADPHONES | 8 TV/HOME ELECTRONICS | $ 6.07 | 6% | 13% | 26% | 39% | $ 0.19 | $ 2.57 | $ 10.70 | $ 15.26 | $ 0.36 | $ 0.76 | $ 1.58 | $ 2.38 | | | | | BULK |
| 013-0 | 0 UTGC CORE KNITS | 13 UNIVERSAL THREAD | $ 6.92 | 6% | 8% | 82% | 31% | $ 0.19 | $ 2.57 | $ 10.70 | $ 15.26 | $ 0.42 | $ 0.52 | $ 5.68 | $ 2.15 | | | | | BULK |
| 009-0 | 3 CUSHIONS 1 | 9 PATIO/GRILL | $ 8.05 | 6% | 20% | 29% | 44% | $ 0.19 | $ 2.57 | $ 10.70 | $ 15.26 | $ 0.48 | $ 1.64 | $ 2.34 | $ 3.50 | | | | | BULK |
| 007-0 | 4 HUGGIES | 7 BABY CARE | $ 21.48 | 6% | 25% | 40% | 50% | $ 0.19 | $ 2.57 | $ 10.70 | $ 15.26 | $ 1.29 | $ 5.33 | $ 8.59 | $ 10.68 | | | | | B2B |
| 009-0 | 3 CUSHIONS 1 | 9 PATIO/GRILL | $ 30.46 | 6% | 20% | 29% | 44% | $ 0.19 | $ 2.57 | $ 10.70 | $ 15.26 | $ 1.83 | $ 6.21 | $ 8.83 | $ 13.25 | | | | | B2B |
| 002-0 | 7 DECORATIVE STORAGE | 2 STORAGE/ORGANIZATION | $ 33.12 | 6% | 14% | 34% | 29% | $ 0.19 | $ 2.57 | $ 10.70 | $ 15.26 | $ 1.99 | $ 4.77 | $ 11.26 | $ 9.47 | | | | | B2B |
| 009-0 | 3 CUSHIONS 1 | 9 PATIO/GRILL | $ 56.62 | 6% | 20% | 29% | 44% | $ 0.19 | $ 2.57 | $ 10.70 | $ 15.26 | $ 3.40 | $ 11.55 | $ 16.42 | $ 24.63 | | | | | D2C |
| 009-0 | 1 FOLDING FURNITURE | 9 PATIO/GRILL | $ 63.88 | 6% | 20% | 44% | 51% | $ 0.19 | $ 2.57 | $ 10.70 | $ 15.26 | $ 3.83 | $ 13.08 | $ 28.11 | $ 32.32 | | | | | LD2C |
| 008-0 | 7 HEADPHONES | 8 TV/HOME ELECTRONICS | $ 139.28 | 6% | 13% | 26% | 39% | $ 0.19 | $ 2.57 | $ 10.70 | $ 15.26 | $ 8.36 | $ 17.55 | $ 36.21 | $ 54.74 | | | | | D2C |
| 002-0 | 7 DECORATIVE STORAGE | 2 STORAGE/ORGANIZATION | $ 140.08 | 6% | 14% | 34% | 29% | $ 0.19 | $ 2.57 | $ 10.70 | $ 15.26 | $ 8.40 | $ 20.17 | $ 47.63 | $ 40.06 | | | | | LD2C |

SORTATION SYSTEM FOR CUSTOMER RETURN ITEMS

TECHNICAL FIELD

This document describes devices, systems, and methods related to sorting reverse items into different categories for different resale channels.

BACKGROUND

Reverse or salvage items, such as returned products, floor damages, overstocks, etc., are typically sold in large pallets, which are useful for discount stores or other large entities that have demand for products in bulk. These discount stores or large entities are low yielding channels, liquidating unsorted or un-manifested pallets of items in bulk at contracted rates. However, the rate of return through these channels steadily declines, compared to higher yielding sale channels, such as direct-to-consumer (D2C) or business-to-business (B2B) channels, that are tailored for targeted, high value items. Typical reverse logistics schemes are not suitable for categorizing reverse items in a granular manner and determining various resale channels suitable for different categories of reverse items in a way that significantly increases a net income from the resale.

SUMMARY

The document generally relates to categorizing reverse items for resale, such as returned items or overstock inventory, and delivering the categorized items through a variety of different reverse supply chains in a way to increase a net recovery rate. The disclosed technology involves a two-step process for sorting the reverse items into different reverse supply channels. First, when the reverse items are initially identified at, for example, a retail store (e.g., when customers return the items), the items can be scanned and divided into two categories based on their value. The two categories can include low value items and high value items. The value of each item can depend on a variety of input factors, for example, a value of the item in a relevant market (e.g., a retail value or a value in a secondary market) and an expense that will be incurred for resale of the item. A threshold that splits the low and high value items can be determined such that a large number of items (e.g., 70% of the reverse items) can be categorized as low value items during this first sortation step and a small number of items can be categorized as high value items. In other words, the threshold can be determined based on a predetermined value calculated from the cost and the expense of each item in a relevant resale market. A bulk of items categorized as low value can be transported to various third party resale networks (e.g., deep discount retailers) that are designed for quick liquidation at a relatively low cost. Therefore, the items of low value can be liquidated quickly to reduce overhead costs.

On the other hand, the items categorized as high value can be shipped to a dedicated return center where a second sortation step can occur. At the return center, some high value items, such as highest value items or items having values that satisfy a threshold level of value, can first be manually tested and graded for condition (e.g., Mint, Like New, Very Good, Good, Refurbished, etc.). The conditioned items can then be scanned and assorted in a granular manner. In some implementations, items that may go through a category-level sort may bypass testing and grading to save expenses and resources. Moreover, the high value items that fail testing and grading may then be directed to a category-level sort rather than being sold as an individual item. For example, the items can be categorized into a large number (e.g., 90 or more) of different sorts, which are potentially taken to different resale channels. The second sortation can be based on various factors, such as the cost, the expense, and the condition of each item. For example, the items categorized into the highest value sort can be sold individually (not as a bundle or a whole sale) in suitable markets (e.g., eBay or other online or offline markets). Further, the items can be categorized into multiple subcategory sorts, and each of the subcategory sorts can be sold at different channels (e.g., sold at contracted rates (certain % of original retail cost) or open at auction). Only a small portion (e.g., 7%) of the reverse items may be categorized as the highest value sort, and a particular portion (e.g., 20-25%) of the reversed items is categorized as different subcategory sorts. Alternatively or in addition, a reverse item can be categorized into the high value sort when it retains a predetermined ratio (e.g., 50-70%) of its original retail value. The subcategories in the second sortation can be determined to reflect various attributes of the items and appropriately group those into different sorts. By way of example, the subcategories can include sporting goods, men's pants, men's shirts, etc. The subcategories can be adjusted over time in a way to increase profit of the resale.

The sortation technique described herein provides a granular approach in segmenting reverse items into a number of narrow category and sub-category level sorts that meet a wide range of needs from buyers. By segmenting items based on the sub-category level (e.g., Furniture, Bath, Bedding, etc.), buyers are able to purchase specific item types they are targeting. The techniques described herein can create a large number (e.g., 96) of sorts to access D2C and High Yield B2B channels and introduce new D2C capabilities related to item grading (New, A-grade, B-grade), unit-level put-away, and order fulfillment after the point of sale for the high value salvage items (e.g., 27.5% of salvage volume) within the central return center. As described above, the remaining low value items (e.g., 72.5% of salvage volume) can be sold via un-sorted and un-manifested bulk liquidation that flow directly to vendors from the stores, thereby bypassing the central return center. The disclosed techniques may also provide solutions that achieve the sorting and manifesting necessary to execute this granular sortation strategy. This high sortation solution can enable leveraging all three available selling channels within the secondary market to increase gross income of the retailer.

Sometimes, the techniques described herein include a low sortation capability that separates high value salvage items (e.g., 27.5% of salvage volume) and low value salvage items (e.g., 72.5% of salvage volume) within stores. This initial sortation can drive incremental benefit by enabling a targeted selling strategy based on resale value of a given item. Low sortation in the two-step sortation process can generate an improved yield by sorting salvage items into one or more (e.g., 13) categories prior to selling on high yield resale channels (e.g., B2B channels). High value salvage items can therefore be sent to a central return center to be sorted for sale on the high yield resale channels, while low value items can be sold via un-sorted and un-manifested bulk liquidation that can flow directly to vendors from the stores (where the reverse items are initially received) bypassing the central return center. As a result, a retailer can leverage two of the three available selling channels within the secondary market to increase gross income.

Similar to the low sortation solution, the techniques described herein can optionally include separating the high value salvage items (e.g., 27.5% of salvage volume) from the low value salvage items (e.g., 72.5% of salvage volume) within stores, with the high value salvage items being directed to the central return center for additional sortation. Introducing more granular sortation steps, each level of sorts within the central return center can enable the sale of salvage directly to consumers for a certain portion of the salvage items (e.g., 7.2% of salvage volume). In addition to selling D2C, additional value can be realized within the B2B channel through greater sub-category level sorts beyond the category level within the central return center for a certain portion of the salvage items (e.g., 20.2% of salvage volume).

According to implementations of the present disclosure, a decision algorithm is provided for the two-step sortation process for sorting reverse items into different reverse supply channels as discussed above. The decision engine is dynamically modified based on market conditions such as resale outcomes, changes in resale channels, and/or other suitable factors. For example, the decision engine can be modified either periodically (e.g., every week, month, year, etc.) or in real-time. Further, the decision engine can be localized to meet different market circumstances in different regions, thereby increasing/maximizing the net recovery rate. The engine is configured for granular sortation (e.g., up to 96 sorts) that can range from an individual item level to an entire store level (e.g., any/all reverse items coming from a particular retail store/environment). The sorts can consider various levels in a merchandise hierarchy including but not limited to category, subcategory, department, division, etc., each of which can be associated with a different resale channel. The engine can actively adjust these sortation levels based on dynamic market demands for individual items and/or categories, so that the reverse items can be resold through different channels that result in the maximum profit for the retail store and/or an entire retail network including the retail store. The engine also can modify shares of low value items and high value items as well as shares of the sorts for the high value items. The decision engine can be a rule-based algorithm. In some implementations, the decision engine can use predictive analytics, artificial intelligence (AI), and/or machine learning models to perform the two-step sortation process.

Particular embodiments described herein include a system for managing and reselling reverse items, the system including: a database storing item data and information about available resale channels, and at least one computing device that can be configured to perform operations that include: identifying the reverse items received at a reverse network, the reverse network being configured to receive reverse items and organize the reverse items into a group of sorts of reverse items corresponding to one or more of the available resale channels, the group of sorts of reverse items being delivered to the one or more of the available resale channels, categorizing the identified reverse items into one or more sorts of reverse items, retrieving, from the database, the item data and the information about available resale channels, and determining, for each of the one or more sorts of reverse items and based on the retrieved item data and the information about the available resale channels, the one or more of the available resale channels that can be configured to deliver each of the one or more sorts of reverse items for resale.

In some implementations, the system can optionally include one or more of the following features. For example, the reverse network can be in communication with the at least one computing device over a data network. The reverse network can include at least one of a retail store, a distribution center, and a customer return center. The available resale channels can include existing secondary market vendors. The item data may include resale prices and processing costs for reverse items.

In some implementations, determining the one or more of the available resale channels can include selecting, for each of the one or more sorts of reverse items, the available resale channel that can be configured to generate a greater profit than profit generated by others of the available resale channels. The operations can further include calculating, for each of the available resale channels, a profit value based on applying a machine learning model to the retrieved item data and the information about the available resale channels. In some implementations, the operations can also include calculating, for each of the available resale channels, a profit value of each of the group of sorts of reverse items based on the resale prices and the processing costs of the reverse items in the item data, and determining, for each of the one or more sorts of reverse items, the one or more of the available resale channels based on the calculated profit value.

As another example, the operations can include receiving, from the determined one or more of the available resale channels, resale data including information of resale of the one or more sorts of reverse items through the determined one or more of the available resale channels, and updating the sales data based on the resale data. The one or more of the available resale channels can be determined using a machine learning model, and the operations can include continuously training the machine learning model with the updated sales data.

In some implementations, the item data can include at least one of item information, item attributes, quantity, market value, materials value, processing cost, timing information, or resale constraints. The item data can include at least one of seasonality of reverse items, inventory levels of reverse items, competition status of reverse items, or marketplace supply status of reverse items. Categorizing the identified reverse items into one or more sorts of reverse items can include categorizing at least one of the identified reverse items into a first sort, and determining the one or more of the available resale channels can include identifying, based on the information about the available resale channels, at least one of the available resale channels that is configured to deliver the first sort of reverse items for resale. Sometimes, categorizing the identified reverse items into one or more sorts of reverse items can include categorizing one or more of the identified reverse items into one or more second sorts, and determining one or more of the available resale channels can include identifying, based on the information about the available resale channels, at least one of the available resale channels that may be configured to deliver the second sorts of reverse items for resale.

As another example, determining the one or more of the available resale channels can include: calculating, for each of the available resale channels, a profit value from resale of each of the one or more sorts of reverse items, and determining the one or more of the available resale channels based on identifying the one or more of the available resale channels having respective profit values exceeding profit values of others of the available resale channels. The operations can also include identifying a value of each of the reverse items, categorizing at least one of the reverse items as a low value item, based on the value of the at least one of the reverse items being equal to or less than a threshold value, and categorizing at least one of the reverse items as a high value item, based on the value of the at least one of the reverse items exceeding the threshold value. The one or more of the available resale channels can be determined by applying a machine learning system to the retrieved item data and the information about the available resale channels.

One or more embodiments described herein can include a non-transitory computer-readable medium having stored therein a program for causing a computer to execute a process of managing and reselling reverse items, the process including: identifying the reverse items received at a reverse network, the reverse network being configured to receive reverse items and organize the reverse items into a group of sorts of reverse items corresponding to one or more of the available resale channels, the group of sorts of reverse items being delivered to the one or more of the available resale channels, categorizing the identified reverse items into one or more sorts of reverse items, retrieving, from the database, the item data and the information about available resale channels, and determining, for each of the one or more sorts of reverse items and based on the retrieved item data and the information about the available resale channels, the one or more of the available resale channels that can be configured to deliver each of the one or more sorts of reverse items for resale.

The non-transitory computer-readable medium can optionally include one or more of the abovementioned features. Additionally or alternatively, the non-transitory computer-readable medium can optionally include one or more of the following features. For example, the process can include calculating, for each of the available resale channels, a profit value of each of the group of sorts of reverse items based on the resale prices and the processing costs of the reverse items in the item data, and determining, for each of the one or more sorts of reverse items, the one or more of the available resale channels based on the calculated profit value. The process may also include receiving, from the determined one or more of the available resale channels, resale data including information of resale of the one or more sorts of reverse items through the determined one or more of the available resale channels, and updating the sales data based on the resale data.

The devices, system, and techniques described herein may provide one or more of the following advantages. In particular, some embodiments described herein include a system for sorting reverse items into low value items for bulk salvage and high value items that are again classified into granular categories. The granular categories are adjusted to maximize the maximum recovery profile, and the resale channels for the categories (including D2C and B2B channels) are also adapted accordingly.

Some embodiments described herein include a decision engine that determines aftermarket sales channels for particular reverse items, which increases profits from the resale of the reverse items. Some embodiments of the present disclosure offer techniques for dynamically generating and adjusting the decision engine to increase or maximize a net income from the reverse items flowing through the reverse networks. The decision engine can be dynamically updated and adaptable to process large sets of data to determine how to resell reverse items. The decision engine can also leverage machine learning algorithms and models to accurately determine how to resell reverse items to optimize net income for the retailer.

Some embodiments described herein provide techniques for improving the reverse business to generate additional income by increasing operations capabilities to sort, grade, and manifest end of life (EOL) products for sale in more profitable channels. It has been understood that the income from reverse item resale would be steadily declining over years due to market saturation, market change, and other factors. However, the techniques of the present disclosure offer significant change in operational capabilities to improve sorting, grading, and manifesting capacity over time (e.g., every year), thereby causing the net income from the resale of reverse items to increase over time.

Typically, all or most of the items that enter the reverse network from stores and distribution centers are placed on pallets and delivered to several different salvage vendors. However, it has been difficult to track and identify the items on the pallets. Further, it was typically unknown the pallet prices on which the salvage vendors agreed during bidding processes. With this conventional system, a net rate of return on these reverse items may be low. At a high level, the techniques according to the present disclosure provide a reverse and re-commerce strategy involving separation between low value items and high value items. With this ability, the same salvage vendors can be utilized to take pallets of low value items while the high value items can be separated out and sent to new reverse item nodes (e.g., dedicated warehouses) to process a granular process for sorting, grading, and manifesting. The manifested pallets of high value items can be disposed through high value resale channels (e.g., Business-to-Business (B2B) channels). In addition, some high value items can be individually sold through other suitable resale channels (e.g., Direct-to-Customer (D2C) channels) that can increase or maximize the resale profit. These additional higher touch channels can yield an improved net rate of return.

For increasing the operational capacities within the reverse network, the new reverse item nodes (e.g., dedicated warehouses) can be equipped with the enhanced capabilities offered by the sortation decision/disposition engine according to the present disclosure. The engine can provide a software platform for warehouse management and sortation to assist the operation of the new reverse item nodes. As described herein, the sortation decision engine is configured to receive and analyze sales data and generate recommendations for optimized resale channels for reverse items, which improve or maximize the resale profit.

Furthermore, the disclosed technology can be integrated seamlessly into existing systems to provide specific intelligence to optimize net incomes regarding reverse networks in the retail network. The disclosed technology can provide for automatic assessment of potential retail value with any available resale channel(s) as well as potential value of a reverse item as a raw material or component for reuse or production of new items. Similarly, the disclosed technology provides for seamless integration of new channels both quickly and easily, as those channels are created (e.g., adding a D2C channel, adding a new recycling capability). The disclosed technology can be integrated with regulatory rules to ensure compliance with auto-defect, ESIM, recalls and other unique circumstances. Moreover, the disclosed technology can provide assessments of cost associated with various resale channels, inclusive of transportation, labor, refurbishment-reconditioning, revenue shares, etc. The disclosed technology can also leverage data from final dispositions to continuously improve the rules and intelligence algorithms, rules, and/or models that drive the decision logic described herein. The disclosed technology may also provide reports in real-time and/or near real-time about volume and routing of reverse items as well as one or more metrics that can be used to understand how each reverse item and/or resale channel is performing. This information can be used by relevant stakeholders to optimize net income throughout the reverse network of the retail network. Similarly, relevant stakeholders can generate override rules to manage exceptions in decisions made using the disclosed techniques, such as donating items to support CR even when a higher value disposition may be available.

As yet another example, the disclosed technology capitalizes on changes in market demand by processing large amounts of data that reflect real-time or near real-time market conditions. Capitalizing on real-time or near real-time market conditions can allow for the retail network to adapt to the changes in market demand to optimize net income throughout the reverse network. The disclosed technology can also be used to identify and determine which items may be more valuable to the retail network by sending those items to secondary liquidation markets versus selling the items at discounted prices in stores within the retail network.

The details of one or more implementations are set forth in the accompanying drawings and the description below. Other features and advantages will be apparent from the description and drawings, and from the claims.

BRIEF DESCRIPTION OF THE DRAWINGS

FIG. 5 is an example table of sub-category sorts used for sorting high value items.

FIG. 9 illustrates a table of example sub-category item sorts and resale channels assigned to each sort.

DETAILED DESCRIPTION OF ILLUSTRATIVE EMBODIMENTS

This document generally describes techniques for sorting reverse items in a reverse network of a retail network in order to maximize net income for the retail network. More particularly, the disclosed techniques provide for sorting reverse items in a granular sortation process. The reverse items can include items that customers return to retail stores in the retail network. The reverse items can additionally or alternatively include overstock inventory in the retail store(s). In addition or alternatively, the revers items can include floor damages, or other items that are not suitable for sale through retail channels. First, reverse items can be categorized into high level and low level sorts. Second, the high level sorted items can further be categorized into one or more of multiple sub-category sorts. The reverse items can be categorized according to various levels in a merchandise hierarchy of the retrial network, including but not limited to category, subcategory, department, division, etc. levels in the merchandise hierarchy. Each sub-category sort level can be associated with one or more different resale channels. The reverse items can be automatically routed to the resale channel(s) that is associated with the item's sub-category sort. Reselling or otherwise distributing the reverse items in the associated resale channels can provide for maximizing net income of the retail network.

Figure 7:
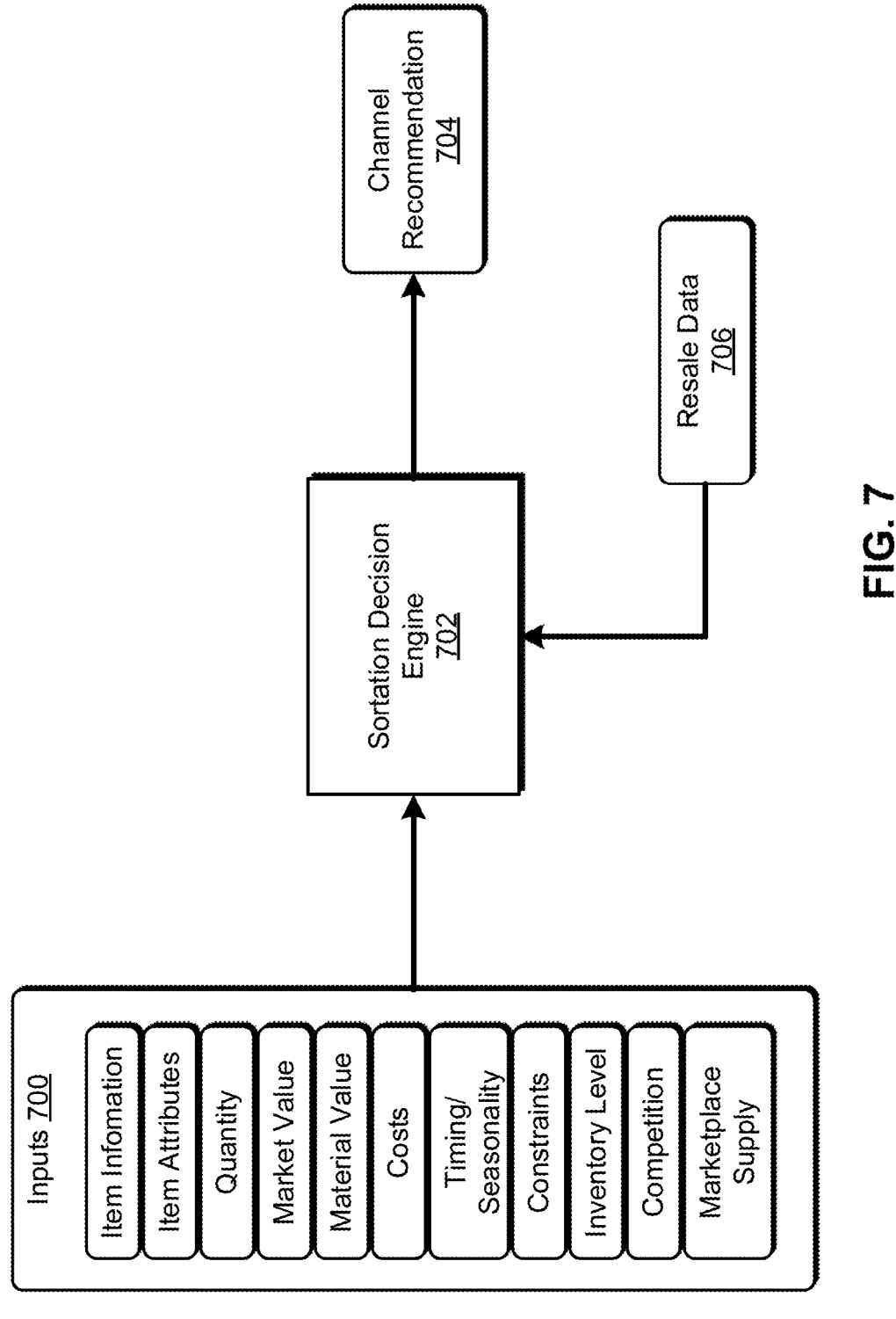
FIG. 7 illustrates an example sortation decision engine for performing a sortation process of high value items in a retail network.
Figure 8:
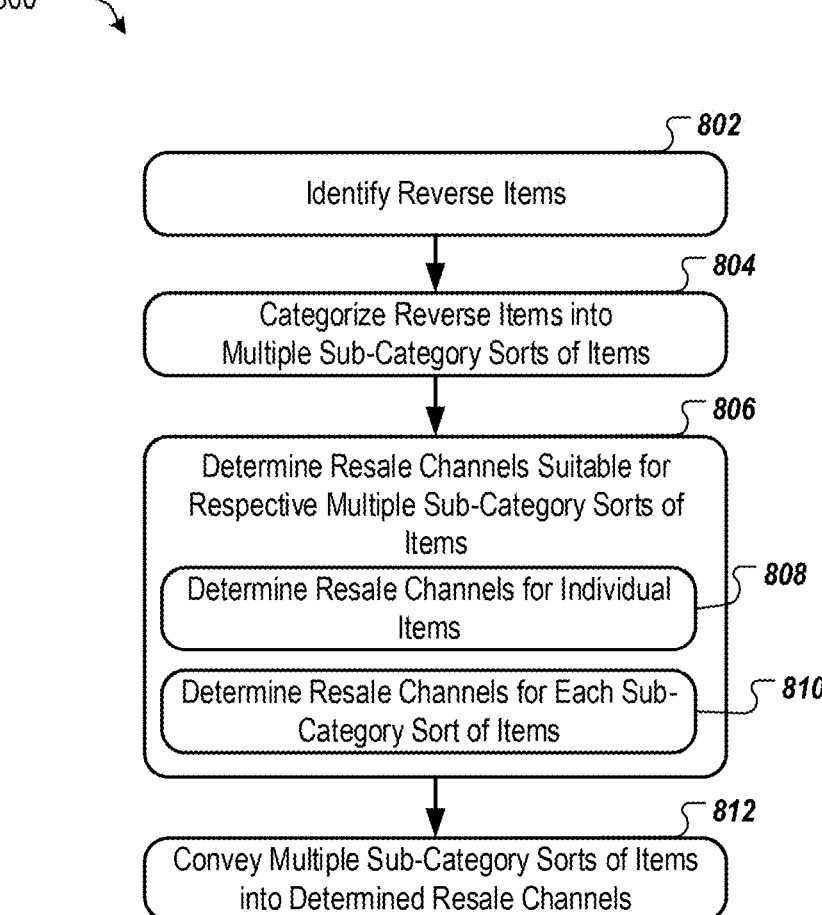
FIG. 8 is a flowchart of a process for sorting reverse items into multiple sub-category sorts of items for disposition in one or more resale channels.

As described further in reference to FIGS. 7-9, at a high level, a sortation decision engine can assign each reverse item or each sort of reverse items to a particular resale channel that may provide a greatest net income or a net income exceeding a predetermined amount. At a more granular level, the sortation decision engine can identify and apply one or more specific rules and/or machine learning models to many data points about the reverse items and the retail network to further sort the reverse items into multiple sub-category sorts.

The models, for example, can be trained to predict a sub-category sort for each reverse item that can result in increased resale profits from the reverse item. The models can further be trained to assign the reverse item to a particular resale channel, according to the sub-category sort for the reverse item. At the particular resale channel, the reverse item can be resold at a price intended to optimize net income for the retail network. The model can leverage both historic and real-time data to accurately calculate the potential net income associated with certain resale channels. Based on this information, the model can be used to assign the sub-category sorted items to channels that result in a highest potential net income or a potential net income that exceeds some threshold value. In addition, the engine can apply the disclosed techniques and machine learning models at an individual item level in addition to or instead of at a class level (at a level of each sort or group of reverse items) to further maximize net income for the retail network. The engine can generate channel recommendations for individual reverse items instead of a sort (or class, group, etc.) of reverse items based on applying the model(s) to historic data and/or real-time data about the individual reverse items, the retail network, and/or the resale channels. Moreover, the engine can calculate costs for individual reverse items, e.g., costs to ship through a D2C channel for each particular reverse item, instead of determining and applying an average for a class/sort/group of reverse items. The cost-by-individual reverse item can be used to more accurately assign the particular reverse item to a resale channel that can maximize net income for the retail network.

The specific rules can include rules corresponding to various aspects and/or information about the types of reverse items and/or sorts of reverse items. By way of example, a rule can associate weight of a reverse item or a sort of reverse items with one or more sub-category sorts and associated resale channel(s). As an illustrative example, if an item has a weight greater than a threshold weight value, the engine can determine that the item should not be delivered through a direct-to-customer (D2C) channel since the cost of this transportation may exceed an expected profit from reselling the item at that channel. Therefore, the engine can determine to exclude a D2C channel for that particular item.

As another illustrative example, for a particular sub-category or subclass of items (e.g., baby care product sub-category/subclass), the engine can exclude a D2C channel if a condition for the item does not meet a threshold condition requirement (e.g., brand new, never open, etc.). As yet another illustrative example, for a particular sub-category or subclass of items (e.g., area rugs), the engine can exclude a particular channel (e.g., D2C, local D2C, or LD2C, which may require customers to come to a warehouse to pick up an item rather than ship the item to the customer) entirely for one or more reasons. As yet another example, for a particular brand product (e.g., a brand of mobile device products), the engine can determine a particular resale channel (e.g., D2C) for a threshold condition of the brand product (e.g., brand new, never open, etc.), and alternatively, may determine one or more additional resale channels (e.g., a salvage vendor associated with the particular brand or contracting with the brand) if the brand product does not meet the threshold condition.

Figure 1A:
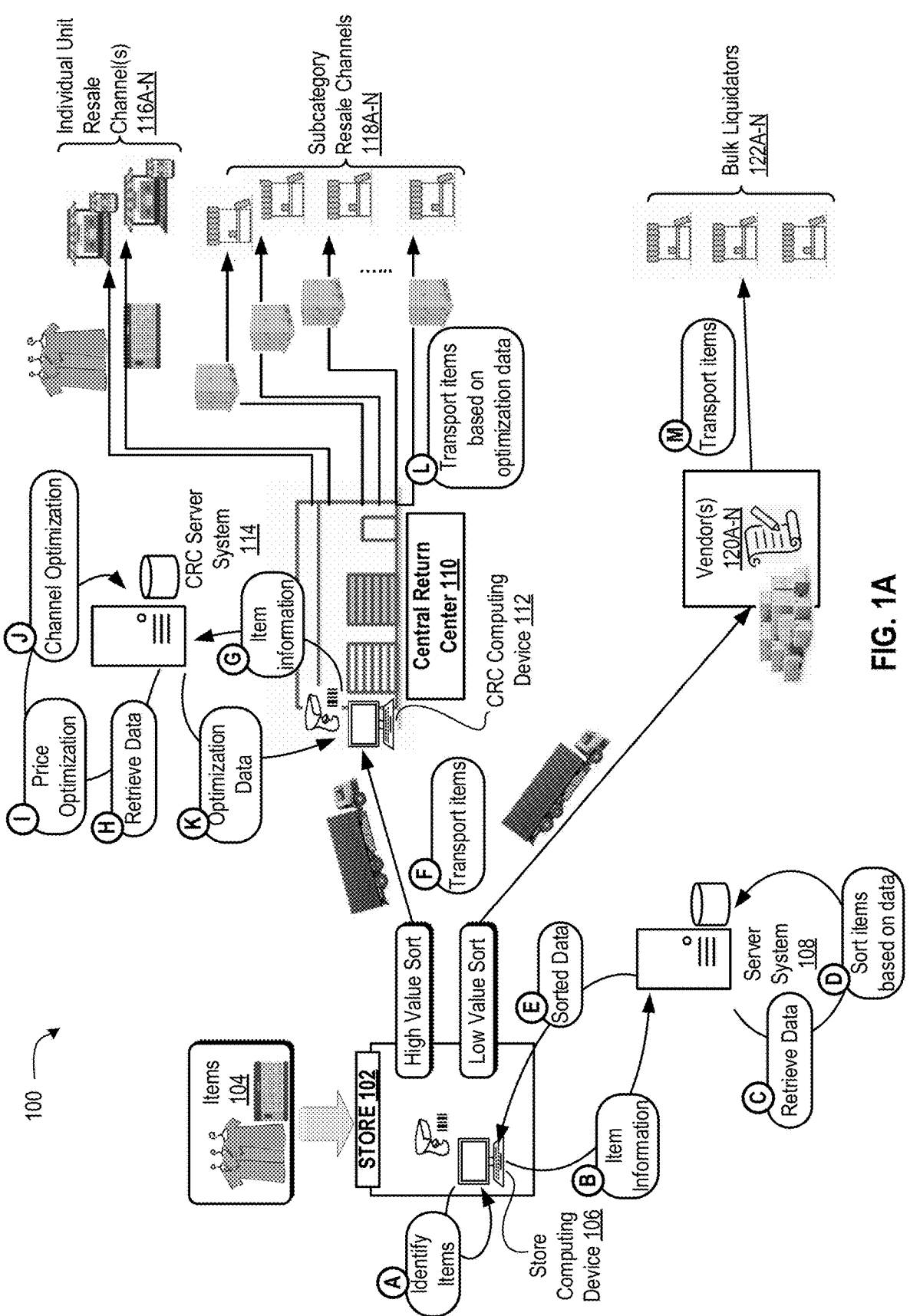
FIG. 1A is a conceptual diagram for automatically categorizing and sorting reverse items for resale in a retail network.

Referring to the figures, FIG. 1A is a conceptual diagram for automatically categorizing and sorting reverse items for resale in a retail network 100. At a high level, reverse items can be categorized, sorted, and then assigned to particular resale channels that can provide a greatest net income (e.g., gross income less expenses) for the retail network 100. One or more sub-rules may also be applied to further determine the appropriate resale channel for each reverse item. As an illustrative example, a sub-rule can be used to route a reverse item away from a direct-to-consumer (D2C) channel if a weight of the reverse item exceeds some threshold weight value. As another illustrative example, a sub-rule can be used for particular subclasses of reverse items and can identify that if reverse items in the particular subclasses have conditions other than brand new or never opened/used, then the reverse items can be blocked from D2C channels. The sub-rules can also indicate whether one or more of the reverse items should be blocked from one or more particular channels. In some implementations, machine learning and/or artificial intelligence (AI) techniques can be used in combination with data about the retail network 100 in order to calculate potential gross income for one or more particular resale channels. For example, the calculated potential gross income can then be used and applied on a category or class of items. In addition or alternatively, the calculated potential gross income can be used and applied on an individual item level rather than a category or class level for items. For example, a cost to ship to a D2C can be calculated for a particular item instead of determining an average cost for shipping items to the particular D2C.

The retail network 100 can include a variety of entities, including but not limited to stores 102, central return centers 110, vendors 120A-N, resale channels 116A-N and 118A-N, and/or bulk liquidators 122A-N.

The store 102 can be a physical retail environment. In some implementations, the store 102 can be an online retail environment that is part of the retail network 100. Items (e.g., products, goods) can be sold and purchased at the store 102. Some items 104 may also be returned at the store 102. These items 104 are also known as reverse items described throughout this disclosure. Customers can, for example, return the items 104. Although FIG. 1A is described in reference to customers returning the items 104, the items 104 can also include overstock inventory items or other suitable items in the store 102.

Referring to the example of FIG. 1A, when the items 104 are returned in the store 102, the items 104 can be scanned using one or more store computing devices 106. The store computing device 106 can be any type of computing device described herein, including but not limited to handheld scanners, other types of scanning devices, RFID readers, tablets, computers, mobile computing devices, computing devices of employees in the store 102, and/or computing devices of the customers returning the items 104.

Once the items 104 are scanned, they can be identified by the store computing device 106 (block A). For example, a barcode, label, or other unique identifier of the items 104 can be scanned by a scanning device. The scanned barcode can be processed by the store computing device 106 (e.g., using optical character recognition (OCR) techniques, object detection techniques, image analysis techniques) to determine an identity of the items 104 or other identifying information about the items. The determined information about the items 104 can then be transmitted to a server system 108 in communication over a network (e.g., wired and/or wireless) with the store computing device 106 for additional processing (block B).

The server system 108 can be any computing system, network of computing devices, and/or cloud-based system configured to determine a sortation of the items 104. In other words, the server system 108 can perform the techniques described herein to determine whether each of the items 104 being returned should be categorized as high value or low value items for purposes of optimizing net income of the retail network 100 when disposing the items 104. In some implementation, the server system 108 is combined with a customer return center (CRC) server system 114 so as to perform a sortation of high value items into multiple sub-categories for resale through different channels suitable for optimizing the net income. As shown, the server system 108 can be remote from the store 102 and can perform the sortation techniques described herein for items returned to multiple stores in the retail network 100. In some implementations, the server system 108 can perform the sortation techniques for a particular store. In some implementations, the server system 108 can be part of the store computing device 106 of the store 102. The server system 108 is similar to or the same as, or implement, a decision system 606, which is described further in reference to FIG. 6.

Figure 6:
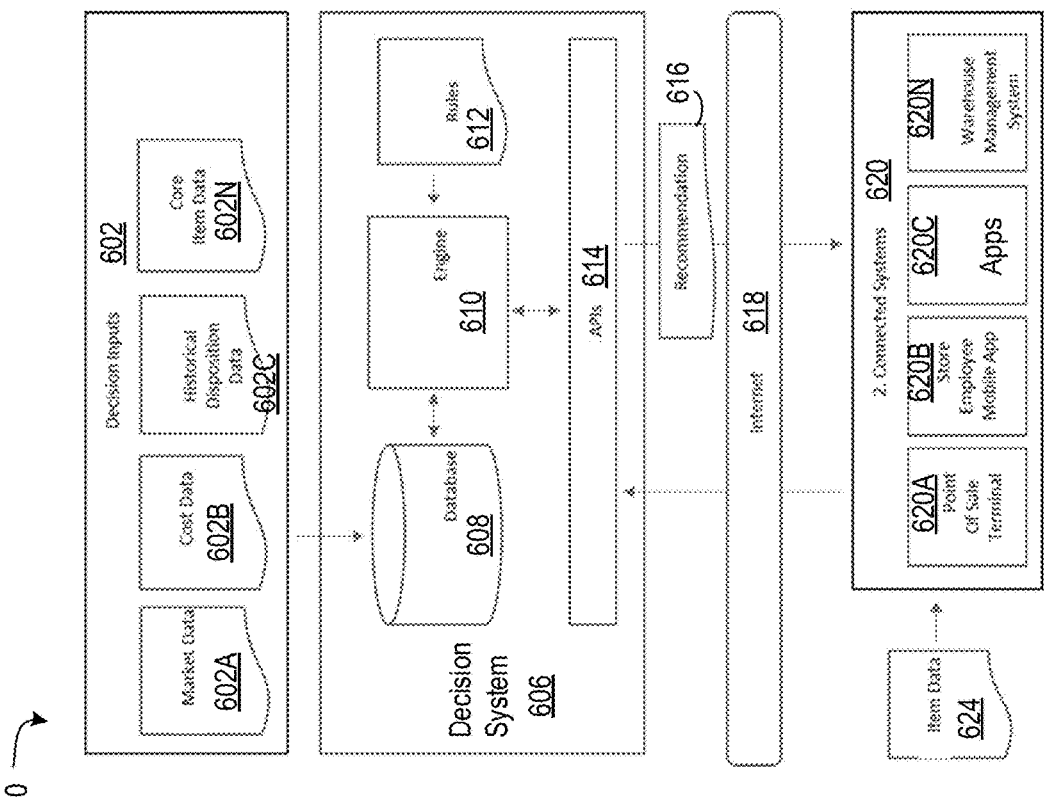
FIG. 6 is a system diagram of components used for performing the disclosed techniques

In FIG. 1A, the server system 108 can retrieve item data for the items 104 based on the determined information that was received in block B (block C). The item data can be retrieved from a database, data store, data repository, and/or cloud-based storage system. The retrieved item data can include, but is not limited to, market data, cost data, historical disposition data, and/or core item data. Refer to FIG. 6 for further discussion about the type of data retrieved in block C.

The server system 108 can use the retrieved data to sort the items 104 (block D). In some implementations, the server system 108 can, for example, provide one or more of the retrieved data as input to a machine learning model that was trained to categorize items as high value or low value based on a combination of one or more of the retrieved data. In alternative implementations, the server system 108 can apply one or more rules to the retrieved data to determine whether the items 104 should be sorted/categorized as high value or low value items.

Once the sortation process is complete in block D, the server system 108 can transmit sorted data back to the store computing device 106 in block E. The sorted data can indicate, for example, whether each of the items 104 has been classified as a high value item or a low value item. The store computing device 106 can generate instructions for bucketizing the items 104 into their classified categories. For example, after the returns are processed for the items 104, an employee in the store 102 can separate items 104 categorized as high value into one group and items 104 categorized as low value into another group.

The high value items can be transported to the central return center (CRC) 110 (block F). The low value items can be transported to the vendors 120A-N (block F). At the central return center 110, a CRC computing device 112 can be configured to process and/or receive information/data about the high value items (block G). For example, the CRC computing device 112 can receive one or more of the item information determined in block A and/or the retrieved data in block C from the store computing device 106 and/or the server system 108. The CRC computing device 112 can also be similar to the store computing device 106 and can be configured to scan the high value items to identify the high value items. The CRC computing device 112 can then retrieve, from the database described herein, additional information about the identified high value items.

The CRC computing device 112 can transmit the item information/data to a CRC server system 114 (block G). The CRC server system 114 can be similar to and/or the same as the server system 108. In some implementations, the CRC server system 114 and the server system 108 can be configured as a combined system. In some implementations, the CRC server system 114 can be part of the CRC computing device 112. The CRC server system 114 can be part of (e.g., an engine or component of) the server system 108. The CRC server system 114 can retrieve data in block H based on the received item information. The data can be similar to and/or the same as the data retrieved in block C. The CRC server system 114 can also retrieve historic data about the retail network 100, a reverse network for the retail network 100, pricing data, and/or channel data, as described herein. Using the retrieved data, the CRC server system 114 can perform a second, more granular sortation process to sort the high value items into one or more sub-categories. The second, more granular sortation process can be performed based on one or more factors, including but not limited to item condition, market value, and/or particular channel expense/cost(s). Refer to FIG. 5 for further discussion about multiple different sub-categories for which the high value items can be sorted.

As part of the second sortation process, the CRC server system 114 can perform a price optimization process (block I). For example, the CRC server system 114 can apply one or more rules and/or machine learning models to the retrieved data to determine pricing of the high value items that may result in optimizing net income for the retail network 100. The pricing of each item can be determined with respect to a corresponding, suitable resale channel or each of the available resale channels. As part of the second sortation process, the CRC server system 114 can perform a channel optimization process (block J). For example, the CRC server system 114 can apply one or more rules and/or machine learning models to the retrieved data (and/or output of the price optimization process in block I) to determine which resale channels 116A-N and/or 118A-N are desired or preferred for reselling the high value items to increase or maximize net profit for the retail network 100. During the channel optimization process, the CRC server system 114 can assign the high value items to one or more particular resale channels 116A-N and/or 118A-N. For example, the high value items can be assigned to resale channels 116A-N as individual units for resale. In other words, a high value item can be identified as most profitable if resold in a retail environment, such as eBay, as an individual unit. Therefore, this high value item can be sorted for resale at a resale channel 116A-N intended for individual unit resale. This high value item can be sold via, for example, online D2C marketplaces. The CRC server system 114 can also assign the high value items to one or more resale channels 118A-N as subcategory resale items. Sometimes, a high value item can be more profitable if sold in some form of bulk as part of a sub-category of items. Accordingly, this high value item can be sorted for resale at a resale channel 118A-N intended for subcategory resale. This high value item can then be sold, for example, via auction and/or contracted rates at the resale channels 118A-N.

Once price and channel optimization has been determined in blocks I and J, the CRC server system 114 can transmit optimization data for the high value items to the CRC computing device 112 (block K). The CRC computing device 112 can then use the optimization data to generate instructions that cause the high value items to be sorted for transport to their designated resale channels 116A-N and/or 118A-N. For example, an employee or other user in the central return center 110 can receive instructions, at their computing device, from the CRC computing device 112 to group some of the high value items for transport to the resale channels 116A-N and others of the high value items for transport to the resale channels 118A-N. In addition or alternatively, the CRC 110 is fully or partially automated to sort the high value items based on the optimization data and convey the sorted items for transportation to respective resale channels. Accordingly, the high value items can then be transported, based on the optimization data, to their respectively assigned resale channels 116A-N and 118A-N (block L).

In some implementations, as described above, high value items can be sorted more granularly to sell in D2C and/or B2B channels. Given a broad range of some item types within a particular category level sort, some customers may only be interested in a subset of high value items included in the sort that the customers are purchasing. Therefore, by segmenting some category level sorts into multiple sub-category level sorts, customers can purchase only the specific item types they target, thereby maximizing gross income for the retail network 100. As an illustrative example, a single Home category can have many sub-category level sorts, such as furniture, bath bedding, kitchen, appliances, etc. By sorting high value items categorized as Home into the multiple sub-category level sorts, customers can more easily find and purchase particular items of interest.

Referring back to the block F, as previously mentioned, low value-sorted items can be transported to the vendors 120A-N. The low value-sorted items can be transported in bulk to the vendors 120A-N. The low value-sorted items can be directed to mixed, un-manifested lots or pallets. In other words, the low value items can be sold in un-sorted and/or un-manifested bulk quantities that can provide for flow of 100% of low value items (e.g., salvage items) directly to the vendors 120A-N, thereby bypassing the central return center 110. Disposing of low value items in this way can be beneficial to leverage bulk liquidation selling channels, thereby offering lowest recovery within a secondary market and generating significant gross income for the retail network 100. The vendors 120A-N can determine how to liquidate the low value items, such as at contracted rates. The vendors 120A-N can also determine which bulk liquidators 122A-N to assign the low value items. Accordingly, the low value items can then be transported to the assigned bulk liquidators 122A-N in block M. The bulk liquidators 122A-N can resell the low value items in bargain discount stores.

Figure 1B:
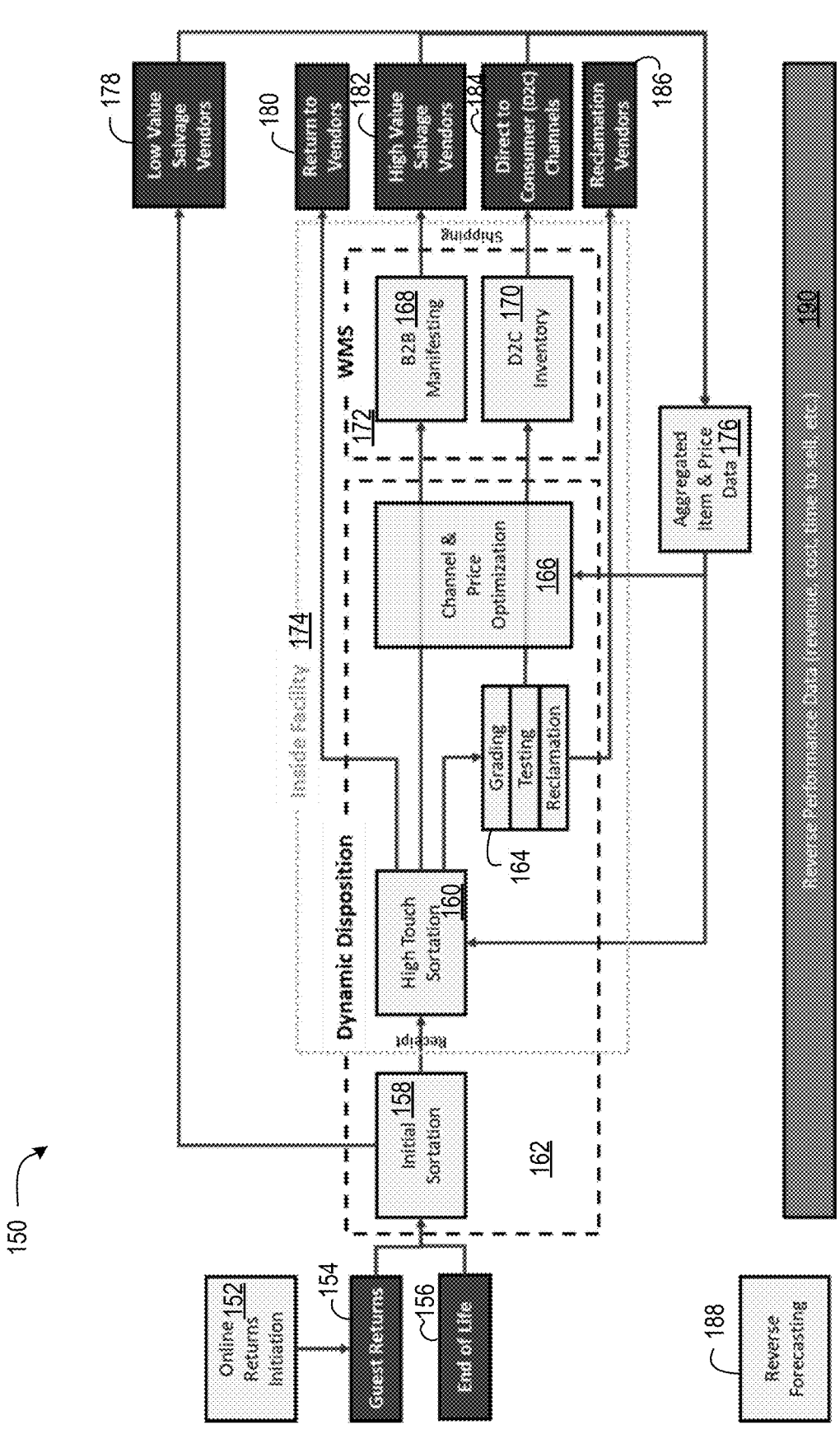
FIG. 1B is a block diagram of a system for automatically categorizing and sorting reverse items for resale in a retail network.

FIG. 1B is a block diagram of a system 150 for automatically categorizing and sorting reverse items for resale in a retail network. The techniques described in reference to FIG. 1B are the same as or similar to the techniques described above in reference to FIG. 1A. As shown, an item return can be initiated in block 152. The return can be initiated in a physical retail store and/or the return can be initiated in an online marketplace associated with the retail network. The item return initiation in block 152 can be identified as guest returns 154 or end of life 156 (e.g., overstock inventory, back of store operations). Next, the returned item(s) can undergo an initial sortation process 158, which can be performed by a dynamic disposition engine 162.

The dynamic disposition engine 162 can be a routing engine that makes decisions at various points within the retail network (e.g., in-stores, online, call center, in distribution center) based upon projected profitability per item. The engine 162 can incorporate various inputs/signals, such as third party new/open box marketplace pricing, historical trends, seasonality, sell-through, and supply chain costs, to make such decisions.

The initial sortation process 158 can include sorting the item as either high value or low value. This sort can be determined based on a variety of factors as described throughout this disclosure. When an item is categorized as low value, information can be generated by the computing systems described herein that causes the low value item to be transported to one or more low value salvage vendors 178.

An item that is categorized as high value can undergo a high touch sortation process 160 inside a facility 174, such as the central return center 110 described in FIG. 1A. Aggregated item and/or price data 176 associated with the high value item can also be processed with reverse logistics processing 164 that includes grading, testing, and reclamation of the item. Such processing 164 may also include receiving and reconciliation, item-level serialization, refurbishment/repair, inspection/grading, and dynamically optimizing disposition of the high value item into either a return to vendor(s) 180, high value salvage vendors 182, bulk business-to-business (B2B) return channel(s), direct-to-consumer (D2C) return channels 184, reclamation vendor(s) 186, and/or other future channels in the retail network.

A channel and price optimization engine 166 can be configured to receive item data (e.g., the data 176) from the high touch sortation process 160 and determine what resale channel to transport the returned item to in order to optimize net income of the retail network. The engine 166 can integrate various disposition channels, including primary and secondary marketplace e-commerce channels, partner D2C and B2B re-commerce channels, and other offline wholesale liquidation channels that may be part of the retail network. The engine 166 can also provide for automating merchandising and optimizing prices of items across all channels.

The item data from the high touch sortation process 160 can also be transmitted to the B2B manifesting engine 168 and/or D2C inventory engine 170 of a warehouse management system 172 (WMS). The engine 168 can provide techniques for building and manifesting pallets of specific item types, managing inventory levels, and preparing shipments to B2B re-commerce channels. The engine 168 can receive information from the high touch sortation process 160 indicating which returned items should be transported/ shipped to which high value salvage vendors 182 (e.g., B2B re-commerce channels). The engine 168 can use this information to generate instructions that route the returned items to the correct resale channel(s). The engine 170 can manage inventory when each item is unique, then ship such items as demand comes into the retail network, either from D2C channels or by re-injecting the items back into the forward retail network. The engine 170 can receive information from the high touch sortation process 160 indicating which items should be transported/shipped to which D2C channels 186. Using this information, the engine 170 can generate instructions that route the items to the correct resale channel(s).

A reverse performance data system 190 can also be part of the system 150 to provide visibility of returned inventory outcomes and feedback on an on-going basis to help the disclosed computing systems, engines, and/or processes make improved future vendor, guest-keep, and/or other business decisions. Real-time reporting, dashboard tools, and data export to various reporting platforms can also be generated and provided by the system 190 to provide comprehensive visibility of a reverse supply chain, which can include physical retail stores, in-person item return initiation, and online return initiation to outbound distribution throughout the reverse network of the retail network.

Moreover, the system 150 can include a reserve forecasting engine 188, which can be configured to forecast a number of units (e.g., dollar amounts) flowing into and/or out of the reverse network of the retail network across various time horizons. Decision outcomes of the engine 188 can be used by any of the described engines (e.g., the initial sortation process 158, the high touch sortation process 160, the channel and price optimization engine 166) to generate informed decisions about how to categorize, sort, and/or transport reverse items in the retail network.

Figure 2:
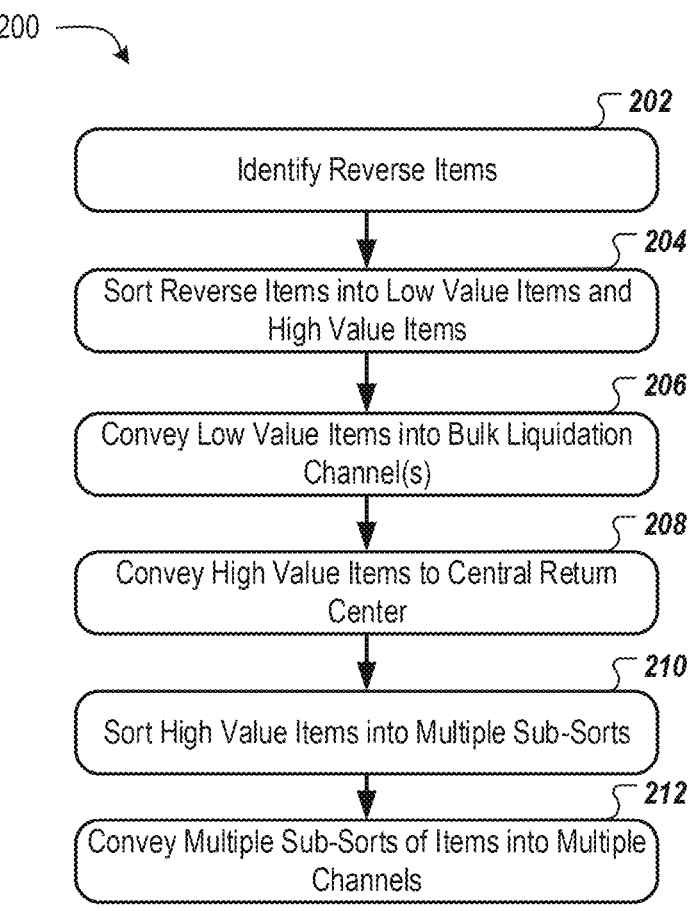
FIG. 2 is a flowchart of a process for automatically categorizing and sorting reverse items for resale in a retail network.

FIG. 2 is a flowchart of a process 200 for automatically categorizing and sorting reverse items for resale in a retail network. The process 200 can be performed by components described herein, or any combination thereof, such as the store computing device 106, the server system 108, the CRC computing device 112, and/or the CRC server system 114 described in FIG. 1A. One or more blocks in the process 200 can also be performed by the system components described in reference to FIG. 6. The process 200 may also be similar to or the same as one or more blocks described in FIG. 1B. For illustrative purposes, the process 200 is described from the perspective of a computing system.

Referring to the process 200 in FIG. 2, the computing system can identify reverse items in block 202. The reverse items can, in some implementations, be identified by a first computing system. The first computing device can include one or more barcode scanners, handheld scanning devices, RFID readers, imaging devices, or other types of scanning devices that can be used and/or available in a retail environment, such as a physical store. The reverse items can be identified by scanning identifiers provided at the reverse items. In other words, labels, barcodes, or other unique identifiers attached to items to be returned can be scanned by a scanning device in the physical store and then processed to identify each of the items as reverse items. In some implementations, the reverse items can be identified once a customer initiates a return of such items using an online service or mobile application presented at their mobile computing device. In some implementations, the items can be identified as reverse items when an employee in the physical store identifies the items as overstock inventory then scans the items using their respective computing device.

In block 204, the computing system can sort the reverse items into low value items and high value items. For example, the computing system retrieve information from a database about each of the identified reverse items. The computing system can process the retrieved information using one or more rules and/or machine learning algorithms to determine whether each of the reverse items should be categorized as a high value item or a low value item. As described herein, high value items can be resold or otherwise distributed in a reverse network of a retail network in such a way that optimizes or otherwise maximizes net income of the retail network. Low value items, on the other hand, may not be as profitable if resold or distributed in the reverse network as high value items. Therefore, the low value items can be handled differently than the high value items. Refer to the process 300 in FIG. 3 for further discussion.

The computing system can generate and return instructions to convey the low value items into one or more bulk liquidation channels in block 206. The low value items can be delivered, using a transportation system, to at least one resale channel that liquidates the low value items as a bulk. Liquidating the low value items in bulk can be more beneficial to maximize net income of the retail network than trying to resell or distribute the low value items as individual units. High value items, on the other hand, may be resold or distributed as individual units or a relatively small group of item if it is determined, by the computing system, that doing so would maximize or otherwise optimize the net income of the retail network.

The computing system can generate and return instructions to convey the high value items to one or more central return centers in block 208. Blocks 206 and 208 can be performed at a same time. Sometimes, block 208 can be performed before block 206. Accordingly, the high value items can be delivered, using the same or a different transportation system as the low value items, to a central return center or resale warehouse that resells or otherwise distributes the high value items.

The computing system can further sort the high value items into multiple sub-sorts in block 210. This can be a second, more granular sortation process performed at the central return center. For example, the high value items can be categorized into one or more sub-sorts, of which one or more resale channels can then be determined for the categorized sub-sorts of the high value items. Refer to the process 400 in FIG. 4 and the table 500 in FIG. 5 for further discussion.

Accordingly, the computing system can generate and return instructions to convey the multiple sub-sorts of items into multiple channels in block 212. The multiple sub-sorts of items can be delivered, using the same or a different transportation system than the transportation system described above, to the one or more resale channels to then be resold and/or distributed in such a manner that maximizes or optimizes net income of the retail network.

Optionally, in some implementations, the computing system can process payment from the bulk liquidation channel(s) of block 206 and/or the multiple channel(s) of block 212. For example, the computing system can process payment from the bulk liquidation channel(s), where the payment is determined at a rate contracted with the respective bulk liquidation channel(s). Sometimes, the payment can be processed by the first computing system described above in block 202. As another example, the computing system can process payment from at least one of the multiple channels, where the payment is determined based on a price paid or payable by a buyer at the respective at least one of the multiple channels. Sometimes, the payment from the at least one of the multiple channels can be processed by a second computing system. The second computing system can be associated with the central return center or resale warehouse described herein.

Figure 3:
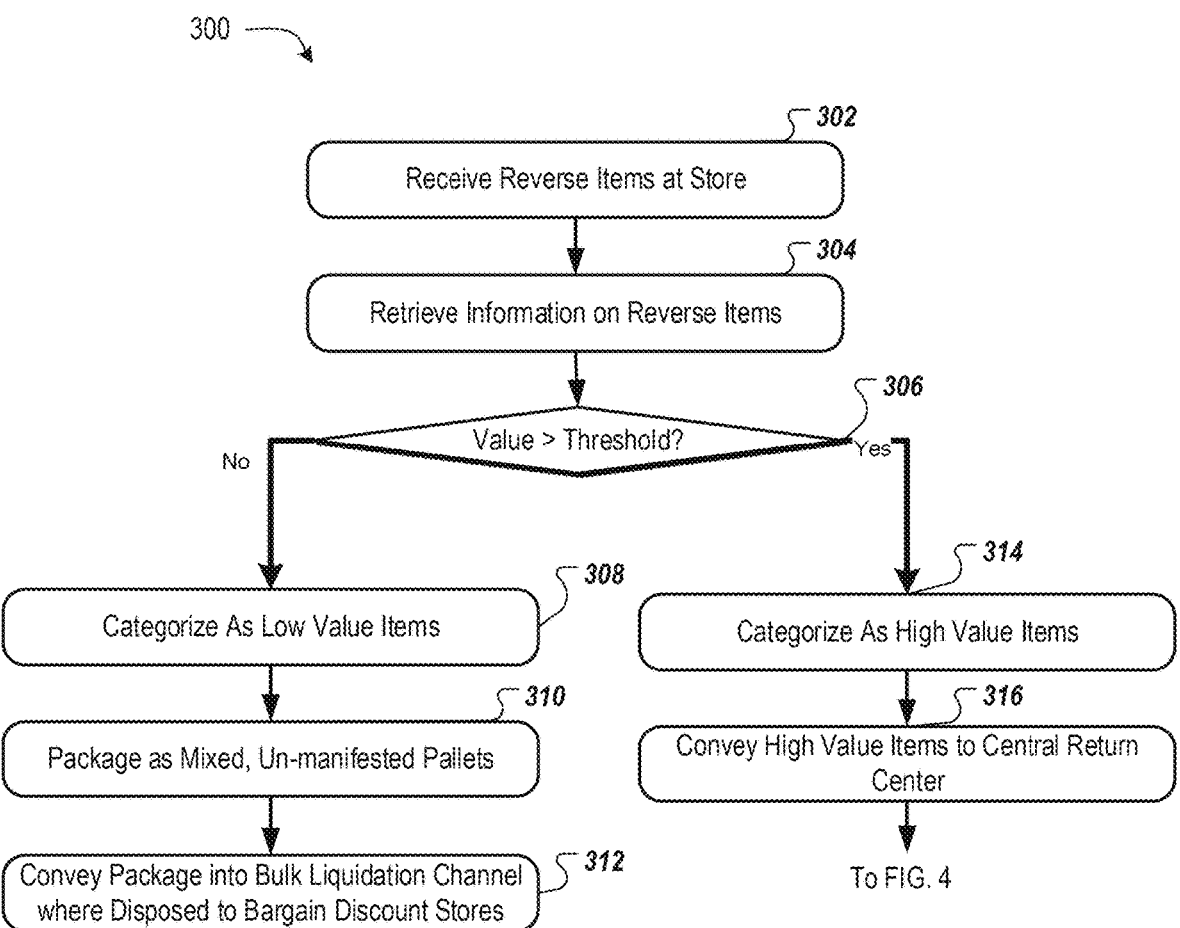
FIG. 3 is a flowchart of a process for categorizing reverse items into low value and high value item categories.

FIG. 3 is a flowchart of a process 300 for categorizing reverse items into low value and high value item categories. The process 300 can be performed by components described herein, or any combination thereof, such as the store computing device 106 and/or the server system 108 described in FIG. 1A. One or more blocks in the process 300 can also be performed by the system components described in reference to FIG. 6. The process 300 may also be similar to or the same as one or more blocks described in FIG. 1B. For illustrative purposes, the process 300 is described from the perspective of a computing system.

Referring to the process 300 in FIG. 3, reverse items can be received at a physical store in block 302. Refer to block 202 in FIG. 2 for further discussion.

Information on the reverse items can be retrieved, by the computing system, in block 304. For example, the computing system can access a database storing reverse item data. The computing system can then retrieve, based on identifiers of the received reverse items, first values of the reverse items from the database. The first values of the reverse items can be determined based on resale costs and/or resale expenses of the reverse items. For example, the first value of each reverse item can be a cost of the item at a resale market less an expense incurred for resale through the market. The computing system can, in some implementations, be the first computing system described in reference to the process 200 in FIG. 2.

The computing system can determine whether value information for each of the reverse items exceeds a threshold value in block 306. The threshold value can, in some implementations, be determined such that a majority of the reverse items can be categorized as a first sort of reverse items (e.g., low value items). The majority of the reverse items can be at least 70% of the reverse items. The majority of the reverse items can also be one or more other percentage values, including but not limited to 51%, 55%, 60%, 75%, 80%, 85%, 90%, 92%, 95%, etc. The threshold value can also be a predetermined monetary value. The predetermined monetary value can be based on historic resale data associated with a retail network having the reverse items.

If the value of a reverse item does not exceed the threshold value, then the computing system can categorize the reverse item as a low value item in block 308. In other words, the computing system can identify, based on the retrieved first values being equal to or less than the threshold value, one or more of the reverse items as a first sort of reverse items.

The computing system may generate and return instructions to package the low value item (as well as other reverse items that have been categorized as low value) as part of mixed, un-manifested pallets (block 310). For example, the first sort of reverse items can be delivered, using a transportation system, to at least one first resale channel. The first resale channel can liquidate the first sort of reverse items as a bulk.

The computing system can then generate and return instructions to convey the packaged low value item(s) into one or more bulk liquidation channels in block 312. The packaged low value item(s) can then be disposed to one or more bargain discount stores.

Referring back to block 306, if the value of each reverse item exceeds the threshold value in block 306, then the reverse item can be categorized, by the computing system, as a high value item in block 314. In other words, the computing system can identify, based on the retrieved first values exceeding the threshold value, one or more of the reverse items as a second sort of reverse items.

The computing system can then proceed to generate and return instructions to convey the high value item (along with other reverse items that have been categorized as high value) to a central return center or resale warehouse, as described throughout this disclosure (block 316). The process 400 described in FIG. 4 can then be performed. For example, the second sort of reverse items can be delivered to the resale warehouse. At the resale warehouse, the second sort of reverse items can be categorized into one or more sub-sorts of reverse items. One or more second resale channels can be determined for the one or more sub-sorts of reverse items. The one or more sub-sorts of reverse items can then be transported, using the same or different transportation system described above, into the one or more second resale channels, respectively.

In some implementations blocks 308 and 314 can be performed at a same or similar time. In some implementations, blocks 312 and 316 can be performed at a same or similar time.

Figure 4:
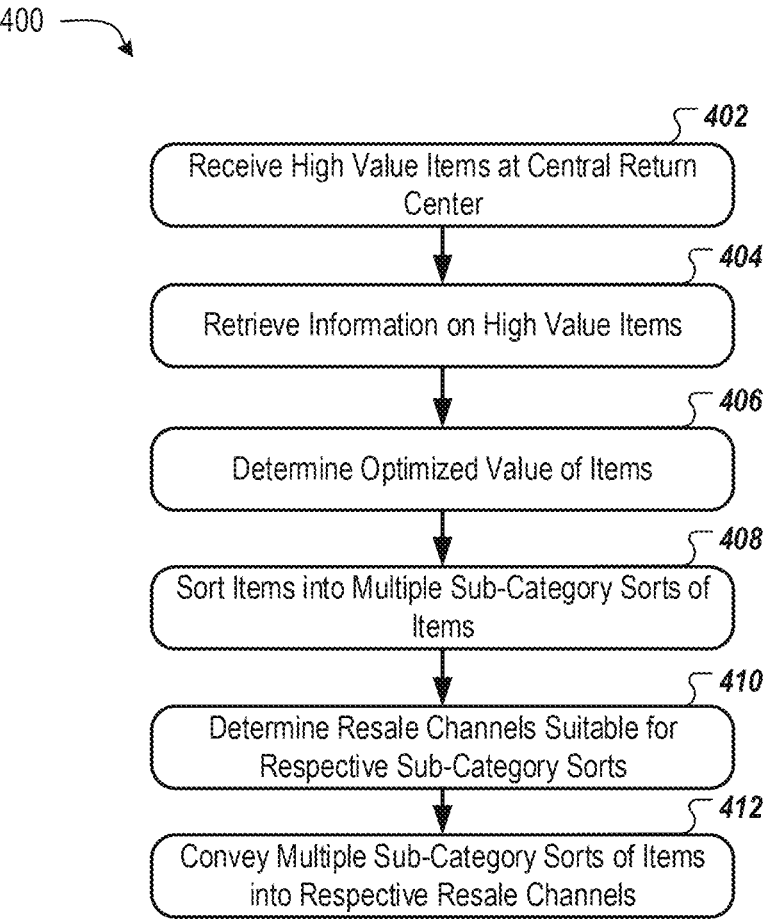
FIG. 4 is a flowchart of a process for sorting high value items into multiple sub-category sorts.

FIG. 4 is a flowchart of a process 400 for sorting high value items into multiple sub-category sorts. The process 400 can be performed by components described herein, or any combination thereof, such as the CRC computing device 112 and/or the CRC server system 114 described in FIG. 1A. One or more blocks in the process 400 can also be performed by the system components described in reference to FIG. 6. The process 400 may also be similar to or the same as one or more blocks described in FIG. 1B. For illustrative purposes, the process 400 is described from the perspective of a computing system.

Referring to the process 400 in FIG. 4, high value items can be received at a central return center, such as a resale warehouse described herein (block 402). Refer to block 208 in the process 200 of FIG. 2 and block 316 in the process 300 of FIG. 3. For example, the computing device can identify the second sort of reverse items described in the process 300 of FIG. 3 by scanning identifiers provided at the second sort of reverse items. In some implementations, the computing system can be a second computing system associated with the resale warehouse.

The computing system can retrieve information on the high value items in block 404. The computing system can access a database storing reverse item data and available resale channels. The computing system can then retrieve, based on the identifiers of the second sort of reverse items, second values of the second sort of reverse items from the database. The second values of the second sort of reverse items can be determined based on a combination of data. The combination of data may include, but is not limited to, resale costs, resale expenses, and/or conditions of the second sort of reverse items. A first sort, as described above, can be performed in a store or other retail environment while the second sort can be performed in a return center. Although the first and second sorts may leverage the same underlying data, having the sorts performed at different times/locations can allow for optimizing expenses and driving efficiencies within the store and the return center in the retail network. In some implementations, the database can be the same as the database described in reference to FIGS. 2 and/or 3. In some implementations, the database can be a second database that is different than the database described in reference to FIGS. 2 and/or 3.

Using the retrieved information, the computing system can determine an optimized value for each of the high value items (block 406). The optimized value can, in some implementations, be a price for reselling the high value item less an expense incurred for resale via a resale market or channel, which can result in optimizing or otherwise maximizing net income for a retail environment having the high value items. The optimized value can reflect the condition of the reverse item, which may affect the resale price through a relevant market or channel.

The computing system can sort the high value items into multiple sub-category sorts of items in block 408. For example, the computing system can determine, based on for example the attributes of the items (e.g., item type), the second sort of reverse items as one or more sub-sorts of reverse items. Further, the retrieved second values described above can be used to determine the second sort of reverse items as one or more sub-sorts of reverse items. The one or more sub-sorts of reverse items can include at least one first sub-sort of reverse items that can be resold as individual items through at least one of one or more second resale channels. The one or more sub-sorts of reverse items may also include at least one second sub-sort of reverse items. Each second sub-sort of reverse items can be sold as a whole through at least one of the one or more second resale channels. Refer to FIG. 5 for further discussion.

In block 410, the computing system can determine one or more resale channels suitable for each of the respective sub-category sorts of items. In other words, the computing system can determine, based on the available resale channels, the one or more of the second resale channels for the one or more sub-sorts of reverse items.

In some implementations, determining the second sort of reverse items as the one or more sub-sorts of reverse items and further determining the one or more second resale channels for the one or more sub-sorts of reverse items can include: calculating, by the computing system and based on the identifiers of the second sort of reverse items, the second values of the second sort of reverse items from the database with respect to each of at least one of the available resale channels, categorizing, using the computing system and based on the calculated values, the second sort of reverse items into the one or more sub-sorts of reverse items, and determining, using the computing system and based on the available resale channels, the one or more second resale channels for the one or more sub-sorts of reverse items, each of the one or more second resale channels being determined to provide a profit for a corresponding one of the one or more sub-sorts of reverse items. The profit can be greater than a profit offered by other available resale channels for the corresponding one of the one or more sub-sorts of reverse items.

The computing system can then generate and return instructions to convey the multiple sub-category sorts of items to the determined, respective resale channels (block 412). Using a transportation system, the one or more sub-sorts of reverse items can be delivered to the one or more second resale channels, respectively. The one or more sub-sorts of reverse items can be resold independently through the one or more second resale channels.

FIG. 5 is an example table 500 of sub-category sorts used for sorting high value items. As described in reference to the process 400 in FIG. 4, each of the high value reverse items can be sorted a second time into one or more of multiple sub-sorts of reverse items. The table 500 indicates some example sub-category sorts for which the high value items can be sorted. The sub-category sorts can include various categories in beauty/cosmetics, essentials, hardlines, home, womens/access, and mens/kids. One or more other sub-category sorts may also be identified for a particular retail network and used for sorting the high value items of that retail network. Additional or fewer sub-category sorts may also be identified for the particular retail network or a group of retail networks and then used for sorting the high value items of that retail network.

In some implementations, the sub-category sorts can be updated over time based on a feedback from the results of resale of reverse items. The sub-category sorts can be modified in a way to optimize or maximize the resale profit of reverse items coming in at stores. The sub-category sorts can vary depending on the types, volumes, weights, and/or other attributes of the reverse items available.

FIG. 6 is a system diagram of components used for performing the disclosed techniques. As shown in system 600, item data 624 can be received from one or more connected systems 620. The item data 624 can be received whenever an item is scanned or otherwise identified as being returned by a customer or part of overstock inventory, as described above. The item data 624 can include, but is not limited to, an Item Identifier (TCIN, UPC, etc.) as well as attributes related to a condition of the item, presence of accessories or packaging, etc.

The connected systems 620A-N can include, but are not limited to, point-of-sale (POS) terminals in one or more physical retail stores (e.g., which can be used for processing in-store returns), store employee mobile applications presented at one or more computing devices of employees in the physical retail store(s) (e.g., which can be used for processing guest returns as well as for repricing items or selecting items for removal from the store), other applications (e.g., which can be used by customers to pre-process returns), and/or a warehouse management system (WMS) (e.g., which can handle movement of the items through the reverse network of the retail network). The connected systems 620A-N can be part of multiple points in a flow of a guest return or inventory removal, which can send requests to a decision system 606 to perform any of the decision processes described herein. Any of the connected systems 620A-N can transmit the item data 624 via a network 618, such as Internet, and APIs 614 to the decision system 606.

The decision system 606 can be configured to perform the techniques described herein, thereby surfacing intelligent disposition decisions for movement of items throughout a reverse supply chain of the retail network. The decision system 606 may include a database 608, a decision engine 610, and the APIs 614. The APIs 614 can include a set of services that provide interfacing for requesting and responding to any of the connected systems 620A-N needing disposition intelligence from the decision system 606.

The database 608 can store various decision inputs 602A-N, including but not limited to market data, cost data, historical disposition data, and/or core item data. One or more of these inputs 602A-N, in addition to the item data 624, can be provided as input to the decision engine 610. The decision inputs 602A-N can be continually ingested into the database 608 to serve as inputs for the decision engine 610. The market data can include channel-specific data related to potential revenue associated with a reverse item (an item to be returned, as represented by the item data 624). The market data can include sales revenue as well as other values such as recycled value of materials, or value of the reduced item as an input to new items. The cost data can include channel-specific data associated with cost of processing the item. The cost data can include transportation costs, labor costs, refurbishment, or fixed per unit costs related to vendor contracts or affiliate fees. The historical disposition data can include results from disposition of past items inclusive of actual costs and revenue as well as soft metrics such as time to sale and/or guest satisfaction. The historical disposition data can include closed loop metrics that allow the engine 610 to refine recommendations based on past outcomes. The core item data can include attributes about the item itself, such as base cost, dimensions, weight, color, size, etc.

The decision engine 610 can use one or more rules 612 to determine how to categorize and/or sort the item(s) represented by the item data 624. The engine 610 can be a core set of code that can process a request for an item, by one or more of the connected systems 620A-N, to evaluate input data 602A-N and the rules 612. The engine 610 can use machine learning techniques, predictive analytics, and/or artificial intelligence to continually optimize recommendations for categorizing and/or sorting the item(s) represented by the item data 624. The rules 612 can include a set of conditions that can be used to influence decisions or override decisions made by the engine 610. Examples of the rules 612 can include, but are not limited to, prioritization of a donation strategy for a particular category or multiple categories of items, environmental rules requiring special or unique disposal of items, etc.

For example, the decision engine 610 can determine whether the item(s) should be categorized as high value or low value. The decision engine 610 can also perform additional processing, such as using machine learning techniques, to determine whether to further sort the high value item(s) into one or more sub-category sorts. Moreover, the engine 610 can determine which resale channel(s) to transport the item(s) to optimize net income of the retail network. Decisions made by the engine 610 can be returned, via the APIs 614, as one or more recommendations 616. The recommendation(s) 616 can be transmitted, via the network 618, to one or more of the connected systems 620A-N. The recommendation 616 can, for example, be presented at the WMS 620N and used to route the item to a particular retail channel that is most likely to optimize the net income of the retail network.

FIG. 7 illustrates an example sortation decision engine 702 for performing a sortation process of high value items in a retail network. The sortation decision engine 702 can be part of the CRC server system 114 of FIG. 1A. The sortation decision engine 702 can be the same as or similar to the engine 610 described in reference to FIG. 6. Moreover, the sortation decision engine 702 can perform the same or similar high touch sortation process 160 and/or channel and price optimization techniques 166 described in reference to FIG. 1B.

The sortation decision engine 702 can be configured to sort high value items into one or more sub-category sorts, then assign the high value items to resale channels based on the sub-category sorts of the items. The sortation decision engine 702 can perform such techniques using one or more rules, rulesets, predictive analytics, artificial intelligence, and/or machine learning models. For example, the sortation decision engine 702 can implement a model. The model can be a profit maximization model that is trained to sort the high value items and identify resale channels based on the sorts that can result in maximizing net income for the retail network.

The model can be trained with a variety of data, such as rate of return information and associated returns processing costs as well as sales data, at various hierarchy levels (e.g., item, class, department, division) and for each available channel (e.g., D2C channels, B2B channels, bulk liquidators). This abundance of real-time and historic data can be leveraged to train a robust model to accurately direct each reverse item that enters a reverse network of the retail network to whichever channel generates a greatest net benefit to the retail network (e.g., channel sale price less processing cost of the resale of the item). The model can further be trained and/or continuously improved to make such determinations on the item level in addition to or instead of a category or sort level. The model may also be trained and built iteratively to ingest new, real-time data for the retail network as that data becomes available. Each improved iteration of the model can increase a rate of return of the retail network's secondary market sales.

Once the model is trained and ready to be deployed, the sortation decision engine 702 can receive a variety of inputs 700 to sort the reverse items and determine their appropriate resale channel assignments. One or more of the inputs 700 can be received from one or more computing systems directed to collecting and/or determining item data, shipping expenses/costs, recovery income from various vendors, operational expenses/costs, etc. One or more of the inputs 700 can be additionally or alternatively retrieved from a data store described herein. The inputs 700 can include, but are not limited to, item information, item attributes, quantity of each reverse item, market value of the reverse item, material value of the reverse item, costs associated with the reverse item, timing and/or seasonality, constraints, inventory level, competition, and/or marketplace supply. Additional, fewer, or other inputs may also be received by the engine 702. The item attributes inputs can include, but are not limited to, condition, packaging, and/or accessories. The market value inputs can include, but are not limited to, refurbished retail resale value, as-is retail resale value, as-is bulk (B2B), and/or rental lifetime value. The material value inputs can include, but are not limited to, component value, raw materials, recycled materials, and/or input for new goods (e.g., new materials). The costs inputs can include, but are not limited to, refurbishment costs, handling costs, transportation costs, and/or affiliate/liquidation fee(s). Future markets, pending volumes, available channels, channel(s) capacity, item setup, recommended vendor contracts, and/or regulatory constraints may also be provided as inputs to the sortation decision engine 702. For example, the regulatory constraints can include, but are not limited to, hazardous and recall. The constraints can include one or more other types of business rules.

The sortation decision engine 702 can process the inputs 700 using the rules and/or machine learning models described herein. By processing the inputs 700, the engine 702 can determine one or more sub-category sorts for each reverse item and a channel recommendation 704 for the reverse item. Various channel recommendations 704 can be generated. For example, the possible recommendations can include, but are not limited to, returning the item to a vendor, returning the item to stock in a physical retail store, returning the item to stock of an online store, holding the item for later resale, marking the item down in price, marking the item as a clearance item, B2C resale as-is, liquidating the item through a vendor, donating the item, recycling the item, disassembling the item for its components, reducing the item to raw materials, destroying the item, and/or allowing a customer to keep the item.

When the engine 702 makes decisions based on processing the inputs 700, the engine can output not only the channel recommendations 704 but also revenue and/or cost determinations associated with handling each of the reverse items, expected profit associated with each of the reverse items, and/or timing information for distributing the reverse items and profiting from the distribution. Any of these outputs can be provided to computing systems of relevant stakeholders in the retail network. For example, the channel recommendations 704 can be provided to computing devices of employees in a return center where the reverse items are located. The employees can move the reverse items to designated locations in the return center for transportation to the channels they have been assigned. One or more of these outputs may also be provided to vendors, liquidators, and/or stakeholders in other resale channels to prepare those channels for receiving the reverse items and reselling the items.

One or more of the abovementioned outputs may also be fed back into the model deployed by the sortation decision engine 702 in order to improve and continuously train the model. As a result, the model can more accurately make sortation decisions and channel assignments with other reverse items in the retail network.

When the reverse items are resold in the recommended channels, resale data 706 can be generated and provided back to the sortation decision engine 702. The resale data 706 can indicate, as examples, prices at which the reverse items were resold, profit(s) from reselling the item(s), amount of time it took to sell the item(s), etc. The resale data 706 can be used, in combination with one or more other inputs 700 in some implementations, to update, train, or otherwise improve the model and decision-making of the engine 702.

Data associated with one or more additional or other factors may also be used to further update, train, or improve the model and decision-making of the engine 702. For example, seasonality data can be used. During different times of the year, items may be sent down different channels. Holidays and/or seasons can drive a recovery rate. As an illustrative example, if a re-commerce marketplace is being flooded by holiday merchandise after Christmas, then the facility described herein may receive lower recovery rates for those types of items during that period of time after Christmas. As another example, since customers seek to buy seasonal items during associated seasons, swimsuits may go direct to consumers in the summer season due to higher demand and then go business to business in the fall season when there is less demand.

Inventory level data may additionally or alternatively be used for model training purposes. Creating a dynamic model that can adjust for incoming volumes and current inventory levels may allow for channel selection to be dynamically modified in such a way that helps push items through the channels faster to then be resold quicker. Sometimes, for example, some items can be maintained in a warehouse for longer if warehouse capacity is low. Vice versa, if the warehouse capacity is constrained, the model can be trained to lower the price and/or suggest a different path for the item in order to increase velocity of throughput.

Competition data can additionally or alternatively be used for model training. Collecting sales data from other secondary market vendors can be beneficial to establish a benchmark for the marketplace. Using this benchmark can help determine how to bring in new items faster (e.g., not dependent on historic data) and also how to remain a competitive force in the marketplace.

Marketplace supply data can additionally or alternatively be used for model training. Training can include establishing thresholds for a number of items that should be posted on D2C channels, then cut over to B2B channels in order to avoid flooding the marketplace with too many items. This can provide improved distribution of the reverse items to channels that can optimize net income for the overall retail network.

FIG. 8 is a flowchart of a process 800 for sorting reverse items into multiple sub-category sorts of items for disposition in one or more resale channels. The process 800, or blocks in the process 800, can be performed by the sortation decision engine 702 described in FIG. 7. One or more other components described herein can perform the process 800. As described herein, the process 800 can be performed using machine learning techniques, rules, algorithms, models, and/or systems. For illustrative purposes, the process 800 is described from the perspective of a computing system.

Referring to the process 800, the computing system can identify reverse items in block 802. The reverse items can be identified using the techniques described above. For example, the computing system can identify the reverse items received at a reverse network of a retail network. The reverse network can be configured to receive reverse items and organize the reverse items into one or more sorts of reverse items that correspond to one or more of available resale channels. The one or more sorts of reverse items can be delivered to the one or more of the available resale channels, as described herein.

The available resale channels can include existing secondary market vendors, in some implementations. Some existing secondary market vendors may focus on sales data and a limited set of channels to optimize their private marketplaces to make disposition determinations. The disclosed techniques, on the other hand, provide for optimizing multiple marketplaces across an array of providers (e.g., B2C, D2C, bulk liquidators).

In some implementations, as part of or after identifying the reverse items, the computing system can identify a value of each of the reverse items. The value can be a combination of data about the reverse item. For example, the value can be a combination of price data, historic sales data, historic returns data, cost data, condition, packaging, and/or other information about the reverse item that may be retrieved from a database. The computing system can then categorize at least one of the reverse items into a low value item, based on the value being equal to or less than some predetermined threshold value. The predetermined threshold value can vary based on factors including but not limited to reverse items, retail network, etc. The computing system can also categorize at least one of the reverse items into a high value item, based on the value of the item(s) exceeding the threshold value. The computing system can then further categorize the high value items using the techniques described below in reference to blocks 804-812. Refer to description above for categorizing the reverse items into high value and low value items.

In block 804, the computing system can categorize the reverse items into multiple sub-category sorts of items. Categorizing the reverse items can include categorizing at least one of the identified reverse items into a first sort. Determining one or more of the available resale changes can also include determining at least one of the available research channels that can deliver the first sort of reverse items for resale. Categorizing the reverse items can also include categorizing at least one of the identified reverse items into one or more second sorts, and determining the one or more available resale channels can include determining or otherwise identifying the available resale channels that can deliver the second sorts of reverse items for resale, respectively. The first and second sorts can be different. The reverse items can be categorized into either the first sort or the second sort. The reverse items may not be categorized into both first and second sorts. In some implementations, the reverse items can be categorized into additional sorts of reverse items for resale. Moreover, the first and second sorts of reverse items for resale can correspond to first and second sub-category sorts. The first and second sub-category sorts can be any of the sub-category sorts depicted and described in reference to FIG. 5. Additional, other, or fewer subcategory sorts may also be defined and used as the first and second sub-category sorts in block 804.

The computing system can determine resale channels suitable for each of the respective multiple sub-category sorts of items in block 806. The determined one or more of the available resale channels can be configured to generate a greater profit than profits of the others of the available resale channels. Accordingly, the computing system can calculate, for each of the available resale channels, a profit of each of the one or more reverse items (and/or each of the respective multiple sub-category sorts of items) based on the resale prices and the processing costs in the item data associated with the respective reverse items. The determined profit can be a net income by resale channel. The resale prices can be estimated or predicted sale price of the respective reverse items (or each of the respective multiple sub-category sorts of items) by resale channel. The processing costs can be estimated or predicted cost of the respective reverse items (or each of the respective multiple subcategory sorts of items) by resale channel. One or more other profit and/or cost data may also be used by the computing system to determine the appropriate resale channel for each sub-category sorts of items and/or each reverse item. For example, in some implementations, the item data can include at least one of item information, item attributes, quantity, market value, materials value, processing cost(s), timing information, and/or resale constraints. In some implementations, the item data can also include at least one of seasonality of reverse items, inventory levels of one or more of the reverse items, competition status of the one or more reverse items, and/or marketplace supply stats of reverse items. Refer to FIG. 7 for further discussion. Accordingly, the computing system can leverage an abundance of historic and/or real-time data about the reverse items in the reverse network to determine appropriate resale channels to optimize net income/profit of the retail network.

As part of determining the resale channels, the computing system can determine resale channels for individual items (block 808). As another example, the computing system can determine resale channels for each sub-category sort of items (block 810). The computing system can retrieve, from a database as described herein, item data and information about available resale channels. Then, the computing system can determine, for each of the one or more sorts of reverse items and based on the retrieved item data, one or more of the available resale channels that can be configured to deliver each of the one or more sorts of reverse items for resale. The item data can include resale prices and processing costs for the reverse items. The item data can be real-time data for the retail network. The item data can also be historic data for the retail network. In some implementations, the computing system can determine the available resale channels based on calculating, for each of the available resale channels, a profit from resale of each of the one or more sorts of reverse levels, and determining one or more of the available resale channels that can be configured to deliver each of the one or more sorts of reverse items for resale. The one or more of the available resale channels can have a profit greater than profits of the other resale channels.

The computing system can generate and transmit instructions to convey the multiple sub-category sorts of items into the determined resale channels (block 812). The instructions can be transmitted to a computing device of a relevant stakeholder in the reverse network and used to determine where to physically route the reverse items. Employees in a returns warehouse can, for example, receive the instructions and use the instructions to move items for one resale channel to one location in the returns warehouse and items for another resale channel to another location in the returns warehouse. In addition or alternatively, various warehouse vehicles and instruments (e.g., forklifts, conveyors, etc.) can be used for the movement of items. The items can then be transported, using a transportation system, to the respective resale channels.

The reverse network described herein can be in communication with the computing system over a data network. The reverse network can also include at least one of a retail store, a distribution center, and a customer return warehouse (e.g., the CRC 110 described in reference to FIG. 1A). The customer return warehouse can be a physical warehouse. In some implementations, the customer return warehouse can also be an online return center.

In some implementations, the computing system can also receive resale data that includes information of resale of the one or more sorts of reverse items through the determined one or more of the available resale channels. Using the resale data, the computing system can update the sales data. Therefore, the resale data can be used to iteratively improve the data and techniques used by the computing system to accurately determine future resale channels for the one or more reverse items (and/or the multiple sub-categories of sorts).

FIG. 9 illustrates a table 900 of example sub-category item sorts and resale channels assigned to each sort. As described above and shown in the table 900, items can be categorized into multiple sub-categories, the sub-categories being on various levels such as class and department levels. Once the items are sorted into the sub-category sorts, item data and other data about a retail network can be retrieved and processed using machine learning techniques, rules, artificial intelligence, and/or predictive analytics to determine recovery amounts (e.g., gross income) from reselling the items and/or net income (e.g., gross income less cost per unit) from reselling the items. This information can then be used to determine a resale channel for which to assign each of the items to maximize net income for the retail network.

As an illustrative example, item 902 has been categorized, using the disclosed techniques, into 2 sub-category sorts: a class of "air care" and a department of "household cleaning." The item 902 can be, for example, air freshening spray. By processing relevant cost data and item data about the item 902 and relevant data about the retail network in which the item 902 was returned (e.g., by a customer at a physical retail store), it is determined that the retail network would gain the most benefit by reselling the item 902 in bulk. Hence, a bulk channel is designated for the item 902. After all, customers may not desire to purchase air freshening sprays that were previously purchased and potentially used by other customers. These types of items may not resell as easily as other types of items, such as electronics or items that are in other conditions (e.g., new, unopened, with original packaging).

On the other hand, item 904 has been categorized into a class of "headphones" and a department of "TV/home electronics." The item 904 can be, for example, a pair of headphones or other similar electronic device. By processing relevant cost data and item data about the item 904 and the data about the retail network in which the item 904 was returned, it is determined that the retail network would gain the most benefit by reselling the item 904 in a D2C channel. Therefore, a D2C channel is designated for the item 904. After all, customers may be more inclined to purchase headphones or other electronic devices that had been previously purchased and potentially used by other customers, especially in scenarios where the headphones can be/are refurbished, in new or like new condition, come with original packaging, have been unopened, etc. Moreover, these types of items can also be resold at higher prices than other types of items, such as item 902, some clothes, lower-quality or lower-branded electronic devices, baby products that have been opened, cushions or bedding or other household items that have been previously used, etc.

Figure 10:
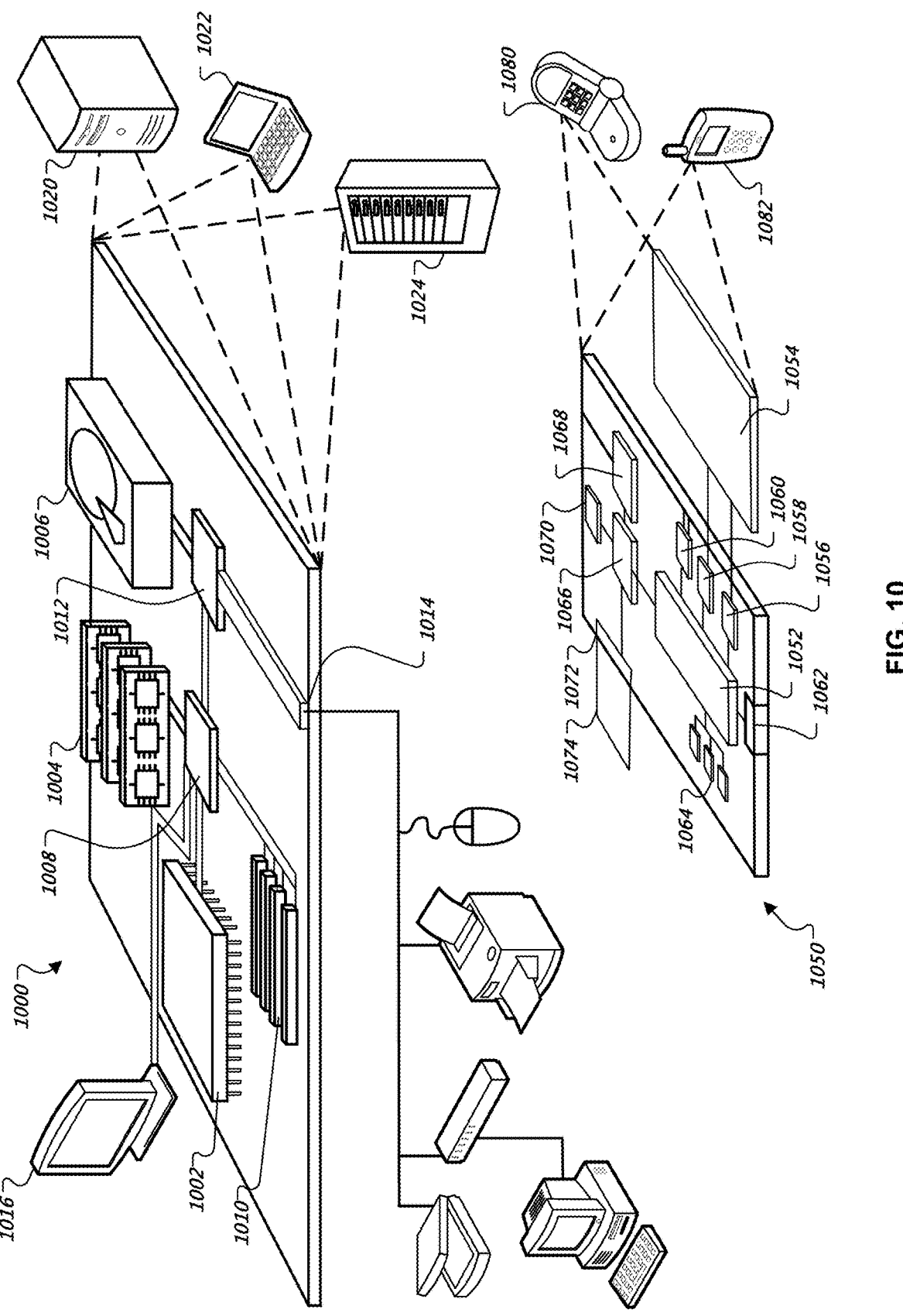
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provided, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone

1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for managing and reselling reverse items, the system comprising:

a database storing item data and information about available resale channels; and at least one computing device configured to communicate with a reverse network including automated sortation equipment, the computing device configured to perform operations comprising:

identifying the reverse items received at the reverse network, the reverse network being configured to receive reverse items and organize the reverse items into a plurality of sorts of reverse items corresponding to one or more of the available resale channels, wherein the plurality of sorts of reverse items are delivered to the one or more of the available resale channels;

categorizing the identified reverse items into one or more sorts of reverse items;

retrieving, from the database, the item data and the information about available resale channels;

calculating, using a machine learning model, a profit value for each of available resale channels based on (i) the item data and (ii) a respective channel processing cost, wherein the machine learning model is continuously retrained using resale outcome data received from the one or more of the available resale channels to update subsequent profit value calculations;

determining, for each of the one or more sorts of reverse items and based on the retrieved item data and the information about the available resale channels, the one or more of the available resale channels configured to deliver each of the one or more sorts of reverse items for resale; and automatically routing, using the automated sortation equipment of the reverse network, the reverse items to one or more sortation destinations associated with the determined resale channels based on the determining.

2. The system of claim 1, wherein the reverse network is in communication with the at least one computing device over a data network.

3. The system of claim 2, wherein the reverse network includes at least one of a retail store, a distribution center, and a customer return center.

4. The system of claim 1, wherein the available resale channels include existing secondary market vendors.

5. The system of claim 1, wherein the item data includes resale prices and processing costs for reverse items.

6. The system of claim 1, wherein determining the one or more of the available resale channels comprises selecting, for each of the one or more sorts of reverse items, the available resale channel that is configured to generate a greater profit than profit generated by others of the available resale channels.

7. The system of claim 6, wherein the operations comprise:

calculating, for each of the available resale channels, the profit value based on applying the machine learning model to the retrieved item data and the information about the available resale channels.

8. The system of claim 5, wherein the operations comprise:

calculating, for each of the available resale channels, the profit value of each of the plurality of sorts of reverse items based on the resale prices and the processing costs of the reverse items in the item data; and determining, for each of the one or more sorts of reverse items, the one or more of the available resale channels based on the calculated profit value.

9. The system of claim 1, wherein the operations comprise:

receiving, from the determined one or more of the available resale channels, resale data including information of resale of the one or more sorts of reverse items through the determined one or more of the available resale channels; and updating the sales data based on the resale data.

10. The system of claim 1, wherein the item data includes at least one of item information, item attributes, quantity, market value, materials value, processing cost, timing information, or resale constraints.

11. The system of claim 1, wherein the item data include at least one of seasonality of reverse items, inventory levels of reverse items, competition status of reverse items, or marketplace supply status of reverse items.

12. The system of claim 1, wherein categorizing the identified reverse items into one or more sorts of reverse items comprises categorizing at least one of the identified reverse items into a first sort, and wherein determining the one or more of the available resale channels comprises identifying, based on the information about the available resale channels, at least one of the available resale channels that is configured to deliver the first sort of reverse items for resale.

13. The system of claim 12, wherein categorizing the identified reverse items into one or more sorts of reverse items comprises categorizing one or more of the identified reverse items into one or more second sorts, and wherein determining one or more of the available resale channels comprises identifying, based on the information about the available resale channels, at least one of the available resale channels that is configured to deliver the second sorts of reverse items for resale.

14. The system of claim 1, wherein determining the one or more of the available resale channels comprises:

calculating, for each of the available resale channels, a profit value from resale of each of the one or more sorts of reverse items; and determining the one or more of the available resale channels based on identifying the one or more of the available resale channels having respective profit values exceeding profit values of others of the available resale channels.

15. The system of claim 1, wherein the operations further comprise:

identifying a value of each of the reverse items;

categorizing at least one of the reverse items as a low value item, based on the value of the at least one of the reverse items being equal to or less than a threshold value; and categorizing at least one of the reverse items as a high value item, based on the value of the at least one of the reverse items exceeding the threshold value.

16. A non-transitory computer-readable medium having stored therein a program for causing a computer to execute a process of managing and reselling reverse items within a reverse network including automated sortation equipment, the process comprising:

identifying the reverse items received at the reverse network, the reverse network being configured to receive reverse items and organize the reverse items into a plurality of sorts of reverse items corresponding to one or more of the available resale channels, wherein the plurality of sorts of reverse items are delivered to the one or more of the available resale channels;

categorizing the identified reverse items into one or more sorts of reverse items;

retrieving, from a database, the item data and the information about available resale channels;

calculating, using a machine learning model, a profit value for each of available resale channels based on (i) the item data and (ii) a respective channel processing cost, wherein the machine learning model is continuously retrained using resale outcome data received from the one or more of the available resale channels to update subsequent profit value calculations;

determining, for each of the one or more sorts of reverse items and based on the retrieved item data and the information about the available resale channels, the one or more of the available resale channels configured to deliver each of the one or more sorts of reverse items for resale; and automatically routing, using the automated sortation equipment of the reverse network, the reverse items to one or more sortation destinations associated with the determined resale channels based on the determining.

17. The non-transitory computer-readable medium of claim 16, wherein the process comprises:

calculating, for each of the available resale channels, a profit value of each of the plurality of sorts of reverse items based on the resale prices and the processing costs of the reverse items in the item data; and determining, for each of the one or more sorts of reverse items, the one or more of the available resale channels based on the calculated profit value.

18. The non-transitory computer-readable medium of claim 16, wherein the process comprises:

receiving, from the determined one or more of the available resale channels, resale data including information of resale of the one or more sorts of reverse items through the determined one or more of the available resale channels; and updating the sales data based on the resale data.

\* \* \* \* \*